US012341990B2

(12) United States Patent
Divorra Escoda et al.

(10) Patent No.: US 12,341,990 B2
(45) Date of Patent: *Jun. 24, 2025

(54) METHOD AND APPARATUS FOR PARAMETRIC, MODEL-BASED, GEOMETRIC FRAME PARTITIONING FOR VIDEO CODING

(71) Applicant: InterDigital VC Holdings, Inc., Wilmington, DE (US)

(72) Inventors: Oscar Divorra Escoda, Barcelona (ES); Peng Yin, Ithaca, NY (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,517

(22) Filed: Dec. 20, 2023

(65) Prior Publication Data

US 2024/0129524 A1    Apr. 18, 2024

Related U.S. Application Data

(60) Continuation of application No. 17/568,311, filed on Jan. 4, 2022, now Pat. No. 11,895,327, which is a
(Continued)

(51) Int. Cl.
*H04N 7/12*          (2006.01)
*H04N 19/117*        (2014.01)
(Continued)

(52) U.S. Cl.
CPC ........... *H04N 19/57* (2014.11); *H04N 19/117* (2014.11); *H04N 19/119* (2014.11);
(Continued)

(58) Field of Classification Search
CPC .................................................. H04N 19/507
See application file for complete search history.

(56) References Cited

U.S. PATENT DOCUMENTS

| 6,097,840 | A  | 8/2000 | Shiitani et al. |
| 2003/0059120 | A1 | 3/2003 | Boon et al. |
| 2004/0091047 | A1 | 5/2004 | Paniconi et al. |

FOREIGN PATENT DOCUMENTS

| JP | H0965338 A | 3/1997 |
| JP | H9065338 A | 3/1997 |

(Continued)

OTHER PUBLICATIONS

Heising, "Efficient Moving Image Coding Using Grid Based Temporal Prediction," Section 7 "Modeling of Motion Discontinuities", Berlin: Technische Universitaet, pp. 1-18, Oct. 2002.
(Continued)

*Primary Examiner* — Y Lee
(74) *Attorney, Agent, or Firm* — Xiaoan Lu

(57) ABSTRACT

There are provided methods and apparatus for adaptive geometric partitioning for video encoding and decoding. An apparatus includes an encoder for encoding image data corresponding to pictures by adaptively partitioning at least portions of the pictures responsive to at least one parametric model. The at least one parametric model involves at least one of implicit and explicit formulation of at least one curve.

22 Claims, 26 Drawing Sheets

Related U.S. Application Data continuation of application No. 17/083,007, filed on Oct. 28, 2020, now Pat. No. 11,252,435, which is a continuation of application No. 15/482,191, filed on Apr. 7, 2017, now abandoned, which is a division of application No. 12/309,496, filed as application No. PCT/US2007/017114 on Jul. 31, 2007, now abandoned.

(60) Provisional application No. 60/834,993, filed on Aug. 2, 2006.

(51) Int. Cl.

| | | |
|---|---|---|
| H04N 19/119 | (2014.01) | |
| H04N 19/126 | (2014.01) | |
| H04N 19/13 | (2014.01) | |
| H04N 19/146 | (2014.01) | |
| H04N 19/156 | (2014.01) | |
| H04N 19/159 | (2014.01) | |
| H04N 19/176 | (2014.01) | |
| H04N 19/189 | (2014.01) | |
| H04N 19/44 | (2014.01) | |
| H04N 19/50 | (2014.01) | |
| H04N 19/507 | (2014.01) | |
| H04N 19/543 | (2014.01) | |
| H04N 19/57 | (2014.01) | |
| H04N 19/61 | (2014.01) | |
| H04N 19/70 | (2014.01) | |

(52) U.S. Cl.
CPC ........... *H04N 19/126* (2014.11); *H04N 19/13* (2014.11); *H04N 19/146* (2014.11); *H04N 19/156* (2014.11); *H04N 19/159* (2014.11); *H04N 19/176* (2014.11); *H04N 19/189* (2014.11); *H04N 19/44* (2014.11); *H04N 19/50* (2014.11); *H04N 19/507* (2014.11); *H04N 19/543* (2014.11); *H04N 19/61* (2014.11); *H04N 19/70* (2014.11)

(56) References Cited

FOREIGN PATENT DOCUMENTS

| | | |
|---|---|---|
| JP | 09270015 A1 | 10/1997 |
| JP | 2005277968 A | 10/2005 |
| JP | 6327003 B2 | 5/2018 |
| JP | 8205172 B2 | 5/2018 |
| WO | WO2008016605 | 2/2008 |

OTHER PUBLICATIONS

Adachi et al., "Refined Results on the Low-Overhead Prediction Modes," Dec. 4-6, 2001 (Dec. 4-6, 2001), ITU—Telecommunications Standardization Sector, Study Group 16, Question 6, Video Coding Experts Group (VCEG), 15th Meeting, Pattava, Thailand, 12 pp. Dec. 4-6, 2001.

Ruhl Uhl G: "Simulation eines Verfahrens zur Bewegungsschatzung und-segmentierung in digitalen Bildsequendzen unter Verwendung eines Blockverzerrungsmodells. PASSAGE" Feb. 1996 (Feb. 1996) Echnische Universtat Berlin, Institut Fur Fernmeldetechnik, Berlin, DE XP002492446 p. 31, line 19-oaoe 33, line 8 fioures 3.8, 3.9, pp. 28-45.

Bronshtein et al., "Handbook of mathematics, Passage", Springer Berlin p. 194 line 15-p. 195, line 15, 2004.

Do et al., "On the Compression of Two-Dimensional Piecewise Smooth Functions" Thessaloniki, Greece, 2001 IEEE International Conference on Image Processing (ICIP) 2001.

Zhang et al., "Variable Block Size Video Coding with Motion Prediction and Motion Segmentation," Optomechatronic Micro/ Nano Devices and Components III: Oct. 8-10, 2007, Lausanne, Switzerland [Proceeding of SPIE, ISSN 0277-786X], SPIE, Bellingham, Wash vol. 2419, pp. 62-70, Jan. 1, 1995.

Ohm J-R: "Multimedia Communication Technology, 5.2 Signal Enhancement", Springer, Berlin, De, 2004 p. 181, col. 15-p. 182, col. 19.

Cheng, "Visual Pattern Matching in Motion Estimation for Object-Based Very Low Bil-Rate Coding Using Moment-Preserving Edge Detection," IEEE Transactions on Multimedia, IEEE Service Center, Piscataway, NJ, vol. 7, No. 2, pp. 189-200, Apr. 1, 2005.

Pandit et al., "On MVC High-Level Syntax for Picture Management", Joint Video (JVT) of ISO/IEC MPEG ITU-T CEG (ISO/IEC JTC1/SC29/WG11 and ITU-T SG16 Q.6), JVT-T131, 20th Meeting, pp. 1-6, Jul. 15-21, 2006.

Kim et al., "Comments on High-Level Syntax for MVC", Contribution to the 76th MPEG meeting, ISO/IEC TC1/ FC29/WG1 MPEG2006/ M13319, pp. 1-10, Apr. 2006.

Kato et al., "Low-overhead Segment Based Motion Compensation for H.26L", IEEE, Piscatawy, vol. IV, pp. 3441-3444, NJ, 2002.

Martinian et al., "Results of Core Experiment IB on Multiview Coding", ISO/IEC JTC1/SC29/WG11, Document 13122, pp. 1-6, Apr. 2006.

Ohm J-R: "Multimedia Communication Technology, 11 Quantization and Coding", 2004. Springer, Berlin.DE, p. 445, line 1-p. 450, line 10, p. 458, line 1-line 29, p. 475, line 10-line 34.

Schwarz et al., "Tree-structured macroblocked partition" ITU— Telecommunications Standardization Sector Study Group 16 Question 6 Video Coding Experts Group (VCEG), 15th Meeting, Pattaya, Thailand, Dec. 4-6, 2001 (Dec. 4-6, 2001).

Hagai et al., "Proposal of Intra Prediction for Improved Macroblock Prediction Modes (VPM2)", Document JVT-B059, Joint Video Team of 1SO/IEC MPEG and ITU-T VCEG, 2nd Meeting: Geneva, CH, 8 pages, Jan. 29-Feb. 1, 2002.

Mueller et al., "Multiview Coding Using AVC", ISO/IEC JTC1/ SC29/WG11, m12945, Coding of Moving Pictures and Associated Audio Information, pp. 1-12, Jan. 2006.

Vetro, "Joint Draft 3.0 on Multiview Video Coding", Joint Video Team (JVT) of ISO/IEC MPEG & ITU-T VCEG (ISO/ EC JTC1/ SC29/WG11 and ITU-T SG16 Q.6, JVT-W209, 23rd Meeting, pp. 1-39, Apr. 21-27, 2007.

Donoho, "Wedgelets: Nearly Minimax Estimation of Edges", The Annalsof statislics, vol. 27, No. 8, Jun. 1999, pp. 859-897.

Hung et al., "On Macroblock Partition for Motion Compensation", Proceedings of The 2006 International Conference on Image Processing (ICIP 2006). vol. 1, 8, IEEE, pp. 1697-1700, Piscataway, NJ, Oct. 2006.

Anonymous, "Technologies under Study for Reference Picture Management and High-Level Syntax for Multiview Video Coding", ISO/IEC JTC1/SC29/WG11, N8018, Coding of Moving Pictures and Audio, pp. 1-10, Apr. 2006.

Anonymous, International Telecommunications Union, ITU-T Telecommunication Standardization Sector of ITU,Sries H:Audiovisual Ano Multimedia Systems, Infrastructure of audiovisual services— Coding of Moving Video Advanced video coding for generic audiovisual services H.264 Mar. 2005, 343 pages.

Divorra et al., "Geometry adaptive Block Partitioning", Video Standards and Drafts, No. VCEG-AF10,Apr. 20, 2007 (Apr. 20, 2007), pp. 1-8, XP030003531 ITU-Telecommunications Standardization Sector, Study group 16 Question 6, Video Coding Experts Group VC EG, 32nd Meeting, San Jose, CA, US the whole document.

Kondo et al., "A Motion Compensation Technique Using Sliced Block In Hybrid Video Coding", In IEEE International Conference on Image Processing 2005, vol. 2, IEEE, pp. 2-6, 2005.

Fukuhara T et al: "Very Low Bit-Rate Video Coding with Block Partitioning and Adaptive Selection of Two Time-Differential Frame Memories" Feb. 2007, IEEE Transactions on Circuits and Systems for Video Technology, vol. 7, No. 1.

Kondo et al., "A Motion Compensation Technique Using Sliced Block In Hybrid Video Coding", IEEE, pp. 1-4, 2005.

Kato et al., "Performance Evaluation on H.26L-based Motion Compensation with Segmented Multiple eference Frames" 2002, IEEE, Piscataway, NJ, US.

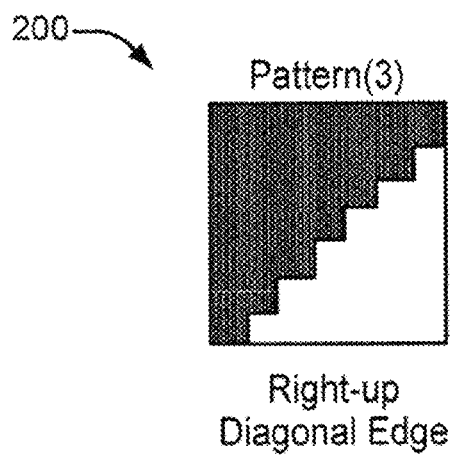
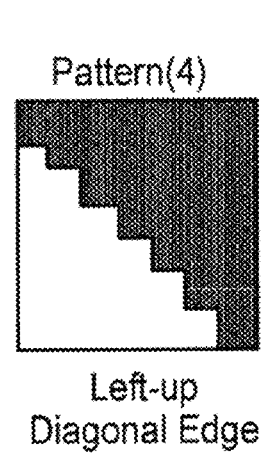
FIG. 2A (PRIOR ART)
FIG. 2B (PRIOR ART)
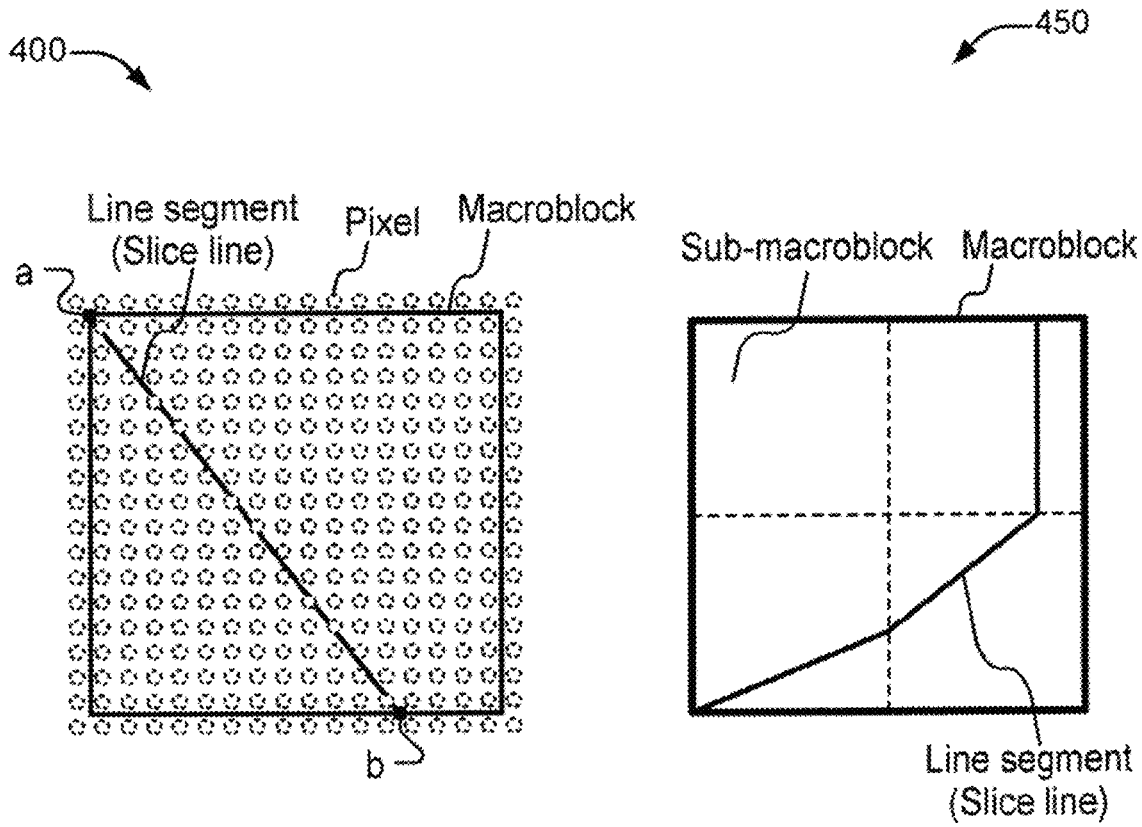
FIG. 4A (PRIOR ART)
FIG. 4B (PRIOR ART)

METHOD AND APPARATUS FOR PARAMETRIC, MODEL-BASED, GEOMETRIC FRAME PARTITIONING FOR VIDEO CODING

CROSS-REFERENCE TO RELATED APPLICATIONS

This application is a continuation of co-pending U.S. application Ser. No. 17/568,311, filed Jan. 4, 2022, which is a continuation of U.S. application Ser. No. 17/083,007, filed Oct. 28, 2020 (U.S. Pat. No. 11,252,435), which is a continuation of U.S. application Ser. No. 15/482,191, filed Apr. 7, 2017, which is a divisional of U.S. application Ser. No. 12/309,496, filed Nov. 9, 2009, which is a National Phase entry under 35 U.S.C. § 371 of International Application No. PCT/US2007/017114, filed Jul. 31, 2007, which claims the benefit of U.S. Provisional Application Ser. No. 60/834,993, filed Aug. 2, 2006, which is incorporated by reference herein in its entirety. Further, this application is related to U.S. application Ser. No. 12/309,540, entitled "Methods and apparatus for adaptive geometric partitioning for video encoding", which is commonly assigned, incorporated by reference herein.

TECHNICAL FIELD

The present principles relate generally to video encoding and decoding and, more particularly, to methods and apparatus for adaptive geometric partitioning for video encoding and decoding.

BACKGROUND

Most video coding techniques use prediction plus residual coding to model video images. Other approaches may also consider prediction as a step into some process of signal transformation, like when lifting schemes are used to generate wavelet transform (with or without motion compensation). Prediction is performed on each frame on a partition basis. That is, each frame is partitioned into blocks or sets of nested blocks in a tree structure, and then each block partition is coded by using an intra or inter predictor plus some residual coding. Frame partitioning into blocks is performed by defining a grid of regions, which are normally blocks (called macroblocks) all over the frame and then each of the macroblocks may also be further partitioned in smaller blocks (also called subblocks or sub-macroblocks). Typically, macroblocks on the boundary of objects and/or frame regions with different textures, color, smoothness and/or different motion, tend to be further divided into subblocks in order to make the coding of the macroblock as efficient as possible, with as much objective and/or subjective quality as possible.

In recent studies, tree structures have been shown to be sub-optimal for coding image information. These studies sustain that tree-based coding of images is unable to optimally code heterogeneous regions (here, regions are considered to have a well-defined and uniform characteristic, such as a flat, smooth, or stationary texture) separated by a regular edge or contour. This problem arises from the fact that tree structures are not able to optimally catch the geometrical redundancy existing along edges, contours or oriented textures. This concept implies that adaptive tree partitioning of macroblocks, even if better than simple fixed-size frame partitioning, is still not optimal enough to capture the geometric information included in 2D data for coding purposes in an efficient manner.

Frame partitioning is a process of key importance in efficient video coding. Recent video compression technologies such as the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"), use a tree-based frame partition. This seems to be more efficient than a simple uniform block partition, typically used in older video coding standards and recommendations such as the International Organization for Standardization/International Electrotechnical Commission (ISO/IEC) Moving Picture Experts Group-2 (MPEG-2) standard and the International Telecommunication Union, Telecommunication Sector (ITU-T) H.263 recommendation (hereinafter the "H.263 Recommendation"). However, tree based frame partitioning still does not code the video information as efficiently as possible, as it is unable to efficiently capture the geometric structure of two-dimensional (2D) data.

Tree-structured macroblock partitioning is adopted in current major video coding standards. The International Telecommunication Union, Telecommunication Sector (ITU-T) H.261 recommendation (hereinafter the "H.261 Recommendation"), the International Organization for Standardization/International Electrotechnical Commission (ISO/IEC) Moving Picture Experts Group-1 (MPEG-1) standard, and the ISO/IEC MPEG-2 standard/ITU-T H.263 recommendation (hereinafter the "MPEG-2 Standard") support only 16×16 macroblock (MB) partition. The ISO/IEC Moving Picture Experts Group-4 (MPEG-4) Part 10 Advanced Video Coding (AVC) standard/ITU-T H.264 recommendation (hereinafter the "MPEG-4 AVC standard") simple profile or ITU-T H.263(+) Recommendation support both 16×16 and 8×8 partitions for a 16×16 MB. The MPEG-4 AVC standard supports tree-structured hierarchical macroblock partitions. A 16×16 MB can be partitioned into macroblock partitions of sizes 16×8, 8×16, or 8×8. 8×8 partitions are also known as sub-macroblocks. Sub-macroblocks can be further broken into sub-macroblock partitions of sizes 8×4, 4×8, and 4×4. Turning to FIG. 1, MPEG-4 AVC standard macroblock division sets are indicated generally by the reference numeral 100. In particular, macroblock partitions are indicated by the reference numeral 110, and sub-macroblock partitions are indicated by the reference numeral 120. In recent studies, tree structures have been shown to be sub-optimal for coding image information. Some of these studies demonstrate that tree-based coding systems are unable to optimally code heterogeneous regions separated by a regular edge or contour.

Some prior work on the subject experimentally identified the need for other types of block partitioning than that supplied by simple tree based partitioning for motion compensation. These techniques propose, in addition to tree based block partition, the use of some additional macroblock partitions able to better adapt to motion edges for motion estimation and compensation.

In one prior art approach (hereinafter "the first prior art approach") within the framework of a H.263 codec, it is proposed to use two additional diagonal motion compensation modes. When one of these modes is selected, concerned macroblocks are partitioned into two similar triangles divided by a diagonal segment. Depending on the coding mode, this goes from lower left corner to upper right corner for one mode, and from upper-left corner to the lower-right one for the second mode. Turning to FIGS. 2A and 2B, additional motion compensation coding modes corresponding to the designated "first prior art approach" described herein are indicated generally by the reference numerals 200 and 250, respectively. The motion compensation coding mode 200 corresponds to a right-up diagonal edge coding mode, and the motion compensation coding mode 250 corresponds to a left-up diagonal edge coding mode.

The first prior art approach is very limited in the sense that these modes are simple variations of the 16×8 or 8×16 motion compensation modes by a fixed diagonal direction. The edge they define is very coarse and it is not precise enough to fit the rich variety of edges found in video frames. There is no explicit coding of geometric information, which impairs from having an adapted treatment of this information in the encoder. Two modes are introduced in the list of coding modes, which increases the coding overhead of other coding modes located after these two in the list of modes.

A direct evolution from the first prior art approach relates to three other prior art approaches, respectively referred to herein as the second, third, and fourth prior art approaches. Collectively in these works, a larger set of motion compensation coding modes are introduced than that described in the first prior art approach. The systems described with respect to the second, third, and fourth prior art approaches introduce a large collection of additional coding modes including oriented partitions. These modes are different translated versions of the 16×8, 8×16 modes as well as different translated versions of the modes proposed in the first prior art approach with a zigzag profile. Turning to FIG. 3, motion compensation coding modes relating to the designated "second", "third", and "fourth prior art approaches" are indicated generally by the reference numeral 300. Eighteen motion compensation coding modes are shown.

As in the case of the first prior art approach, the partitions defined in the second, third, and fourth prior art approaches for motion compensation are very gross and imprecise with video frames content. Even if the set of oriented partitions outnumber those in the first prior art approach, they are still not precise enough for efficient coding of the rich variety of edges found in video frames. In this case, there is no explicit coding of geometric information, which impairs to have an adapted treatment of the geometric information in the encoder. Moreover, the overhead introduced in order to code the much larger set of modes has an even worse effect on the non-directional modes that follow the oriented modes in the list of modes.

A fifth prior art approach proposes the use of intra prediction within the partitions of the oriented modes from the second, third, and fourth prior art approaches, in addition to their former purpose for motion compensation based prediction. The limitations of the fifth prior art approach are inherited from the second, third, and fourth prior art approaches, hence all those stated in previous paragraphs also apply to the fifth prior art approach.

A sixth prior art approaches proposes the most flexible framework from the works found in the literature. The sixth prior art approach proposes the introduction of only 2 modes where segments connecting two boundary points are used to generate block partitions. The first of the proposed motion compensation coding modes divides a macroblock into two partitions separated by a segment connecting two macroblock boundary points. Turning to FIG. 4A, macroblock partitioning according to a first motion compensation coding mode of the designated "sixth prior art approach" described herein is indicated generally by the reference numeral 400.

The second proposed mode is based on a primary division of the macroblock into subblocks, and then, each subblock is divided using a segment connecting two points on the boundary of each subblock. Turning to FIG. 4B, macroblock partitioning according to a second motion compensation coding mode of the designated "sixth prior art approach" described herein is indicated generally by the reference numeral 450.

Several limitations still exist with respect to the scheme outlined in the sixth prior art approach, and include the following.

In a first limitation related to the sixth prior art approach, block partitioning defined as the connection of two boundary points by a segment is not able to handle, efficiently, cases of more complex boundaries or contours. For this, the sixth prior art approach proposes the division of macroblocks into subblocks, and the use of points connecting segments in every subblock, in order to approximate more complex shapes, which is inefficient.

In a second limitation related to the sixth prior art approach, partitions are only conceived for motion compensation, disregarding the use of some intra coding technique within the generated partitions. This disables the proposed technique to handle uncovering effects (situations where new data appears from behind an object during a sequence), or simply to code information in a non-temporally predictive way in any of the video frames.

In a third limitation related to the sixth prior art approach, partition coding by coding boundary points is not efficient enough in terms of distortion and coding cost. This is because they are not able to properly represent the geometric characteristics of the partitions boundary; hence, they do not properly show the geometric characteristics of the data in the video frame. Indeed, data in video frames typically presents different statistics for geometric information like local orientations and local positions of different video components and/or objects. The simple use of boundary points is unable to reflect such information. Thus, one cannot exploit such statistics for coding purposes.

In a fourth limitation related to the sixth prior art approach, different video compression qualities have different geometric information precision requirements in order to achieve the best distortion versus coding cost trade-off. The sixth prior art approach does not adapt the information sent to encode the block partitions depending on the video compression quality. Moreover, as the sixth prior art approach does not have and/or otherwise describe a proper representation of partition geometric information, the sixth prior art approach cannot favor, if needed, the encoding of some kind of geometric information with higher precision than some other kind of geometric information.

In a fifth limitation related to the sixth prior art approach, the sixth prior art approach does not appear to handle those pixels lying on the boundary of the partitions which are partly on one side of the boundary, and partly on the other side. These pixels should be able, when needed, to mix information from both partition sides.

Turning to FIG. 8, a video encoder capable of performing video encoding in accordance with the MPEG-4 AVC standard is indicated generally by the reference numeral 800.

The video encoder 800 includes a frame ordering buffer 810 having an output in signal communication with a non-inverting input of a combiner 885. An output of the combiner 885 is connected in signal communication with a first input of a transformer and quantizer 825. An output of the transformer and quantizer 825 is connected in signal communication with a first input of an entropy coder 845 and a first input of an inverse transformer and inverse quantizer 850. An output of the entropy coder 845 is connected in signal communication with a first non-inverting input of a combiner 890. An output of the combiner 890 is connected in signal communication with a first input of an output buffer 835.

A first output of an encoder controller 805 is connected in signal communication with a second input of the frame ordering buffer 810, a second input of the inverse transformer and inverse quantizer 850, an input of a picture-type decision module 815, an input of a macroblock-type (MB-type) decision module 820, a second input of an intra prediction module 860, a second input of a deblocking filter 865, a first input of a motion compensator 870, a first input of a motion estimator 875, and a second input of a reference picture buffer 880.

A second output of the encoder controller 805 is connected in signal communication with a first input of a Supplemental Enhancement Information (SEI) inserter 830, a second input of the transformer and quantizer 825, a second input of the entropy coder 845, a second input of the output buffer 835, and an input of the Sequence Parameter Set (SPS) and Picture Parameter Set (PPS) inserter 840.

A first output of the picture-type decision module 815 is connected in signal communication with a third input of a frame ordering buffer 810. A second output of the picture-type decision module 815 is connected in signal communication with a second input of a macroblock-type decision module 820.

An output of the Sequence Parameter Set (SPS) and Picture Parameter Set (PPS) inserter 840 is connected in signal communication with a third non-inverting input of the combiner 890.

An output of the inverse quantizer and inverse transformer 850 is connected in signal communication with a first non-inverting input of a combiner 825. An output of the combiner 825 is connected in signal communication with a first input of the intra prediction module 860 and a first input of the deblocking filter 865. An output of the deblocking filter 865 is connected in signal communication with a first input of a reference picture buffer 880. An output of the reference picture buffer 880 is connected in signal communication with a second input of the motion estimator 875. A first output of the motion estimator 875 is connected in signal communication with a second input of the motion compensator 870. A second output of the motion estimator 875 is connected in signal communication with a third input of the entropy coder 845.

An output of the motion compensator 870 is connected in signal communication with a first input of a switch 897. An output of the intra prediction module 860 is connected in signal communication with a second input of the switch 897. An output of the macroblock-type decision module 820 is connected in signal communication with a third input of the switch 897. An output of the switch 897 is connected in signal communication with a second non-inverting input of the combiner 825.

Inputs of the frame ordering buffer 810 and the encoder controller 805 are available as input of the encoder 800, for receiving an input picture 801. Moreover, an input of the Supplemental Enhancement Information (SEI) inserter 830 is available as an input of the encoder 800, for receiving metadata. An output of the output buffer 835 is available as an output of the encoder 800, for outputting a bitstream.

Turning to FIG. 10, a video decoder capable of performing video decoding in accordance with the MPEG-4 AVC standard is indicated generally by the reference numeral 1000.

The video decoder 1000 includes an input buffer 1010 having an output connected in signal communication with a first input of an entropy decoder 1045. A first output of the entropy decoder 1045 is connected in signal communication with a first input of an inverse transformer and inverse quantizer 1050. An output of the inverse transformer and inverse quantizer 1050 is connected in signal communication with a second non-inverting input of a combiner 1025. An output of the combiner 1025 is connected in signal communication with a second input of a deblocking filter 1065 and a first input of an intra prediction module 1060. A second output of the deblocking filter 1065 is connected in signal communication with a first input of a reference picture buffer 1080. An output of the reference picture buffer 1080 is connected in signal communication with a second input of a motion compensator 1070.

A second output of the entropy decoder 1045 is connected in signal communication with a third input of the motion compensator 1070 and a first input of the deblocking filter 1065. A third output of the entropy decoder 1045 is connected in signal communication with an input of a decoder controller 1005. A first output of the decoder controller 1005 is connected in signal communication with a second input of the entropy decoder 1045. A second output of the decoder controller 1005 is connected in signal communication with a second input of the inverse transformer and inverse quantizer 1050. A third output of the decoder controller 1005 is connected in signal communication with a third input of the deblocking filter 1065. A fourth output of the decoder controller 1005 is connected in signal communication with a second input of the intra prediction module 1060, with a first input of the motion compensator 1070, and with a second input of the reference picture buffer 1080.

An output of the motion compensator 1070 is connected in signal communication with a first input of a switch 1097. An output of the intra prediction module 1060 is connected in signal communication with a second input of the switch 1097. An output of the switch 1097 is connected in signal communication with a first non-inverting input of the combiner 1025.

An input of the input buffer 1010 is available as an input of the decoder 1000, for receiving an input bitstream. A first output of the deblocking filter 1065 is available as an output of the decoder 1000, for outputting an output picture.

SUMMARY

These and other drawbacks and disadvantages of the prior art are addressed by the present principles, which are directed to methods and apparatus for adaptive geometric partitioning for video encoding and decoding.

According to an aspect of the present principles, there is provided an apparatus. The apparatus includes an encoder for encoding image data corresponding to pictures by adaptively partitioning at least portions of the pictures responsive to at least one parametric model. The at least one parametric model involves at least one of implicit and explicit formulation of at least one curve.

According to another aspect of the present principles, there is provided a method. The method includes encoding image data corresponding to pictures by adaptively partitioning at least portions of the pictures responsive to at least one parametric model. The at least one parametric model involves at least one of implicit and explicit formulation of at least one curve.

According to yet another aspect of the present principles, there is provided an apparatus. The apparatus includes a decoder for decoding image data corresponding to pictures by reconstructing at least portions of the pictures partitioned using at least one parametric model. The at least one parametric model involves at least one of implicit and explicit formulation of at least one curve.

According to still another aspect of the present principles, there is provided a method. The method includes decoding image data corresponding to pictures by reconstructing at least portions of the pictures partitioned using at least one parametric model. The at least one parametric model involves at least one of implicit and explicit formulation of at least one curve.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIGS. 2A and 2B show diagrams for additional motion compensation coding modes corresponding to the designated "first prior art approach" described herein;

FIG. 4A shows a diagram for macroblock partitioning according to a first motion compensation coding mode of the designated "sixth prior art approach" described herein;

FIG. 4B shows a diagram for macroblock partitioning according to a second motion compensation coding mode of the designated "sixth prior art approach" described herein;

DETAILED DESCRIPTION

Figure 1:
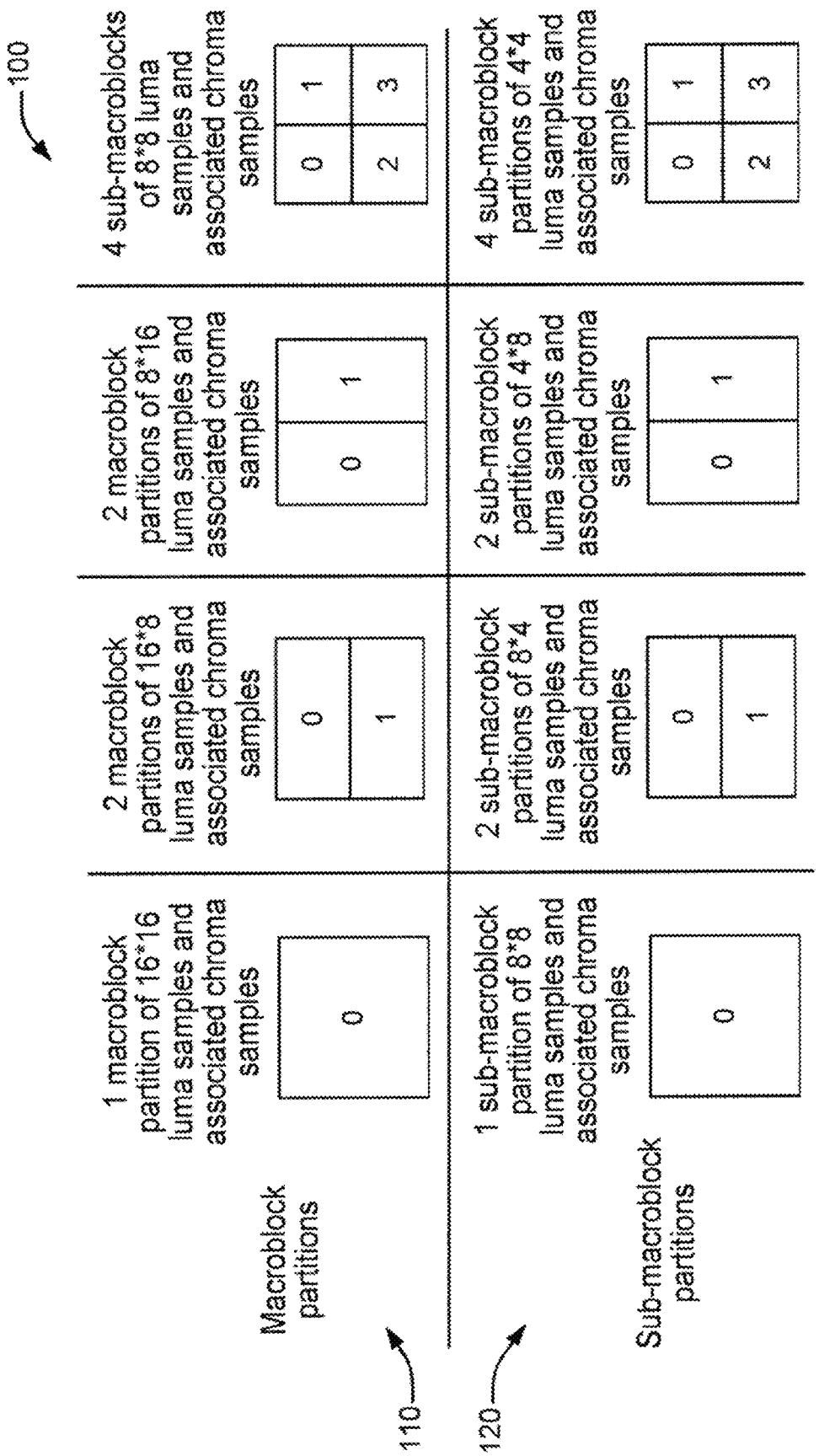
FIG. 1 shows a diagram for MPEG-4 AVC standard macroblock division sets to which the present principles may be applied.
Figure 3:
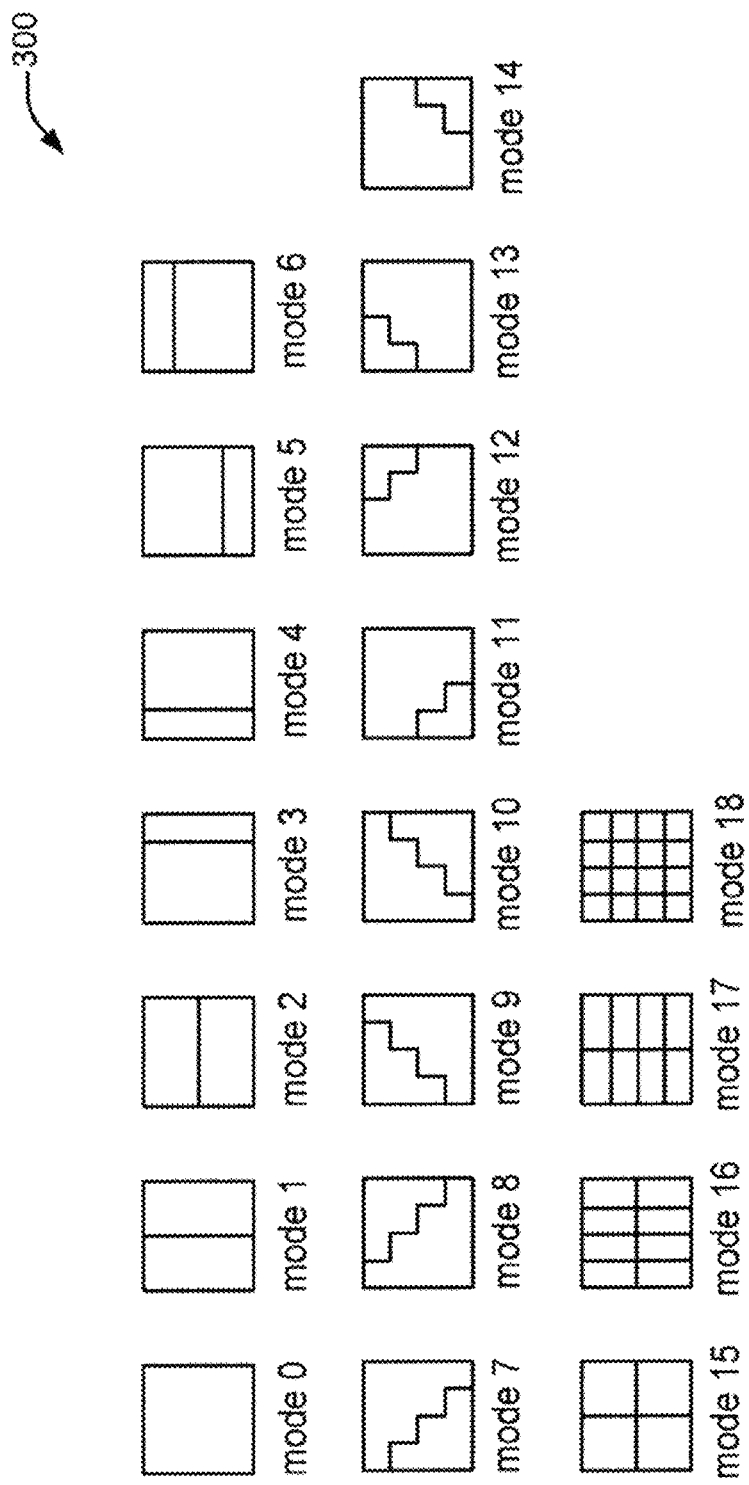
FIG. 3 shows a diagram for motion compensation coding modes relating to the designated "second", "third", and "fourth prior art approaches" described herein.

The present principles are directed to methods and apparatus for adaptive geometric partitioning for video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the terms "blocks" and "regions" are used interchangeably herein.

It is to be further appreciated that the phrase "existing video coding standard" and "video coding recommendation" may refer to any existing video coding standard and recommendation, including those not yet developed, but existing within a time of application of the present principles thereto. Such standards and recommendations include, but are not limited to, H.261, H.262, H.263, H.263+, H.263++, MPEG-1, MPEG-2, MPEG-4 AVC, and so forth.

Moreover, the term "extended version" when used with respect to a video coding standard and/or recommendation, refers to one that is modified, evolved, or otherwise extended.

Also, it is to be appreciated that the phrase "image data" is intended to refer to data corresponding to any of still images and moving images (i.e., a sequence of images including motion).

Additionally, as used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, picture parameter set level, sequence parameter set level and NAL unit header level.

It is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

As noted above, the present principles are directed to methods and apparatus for adaptive geometric partitioning for video encoding and decoding.

One or more embodiments of the present principles use parametric models for frame region partitioning, that is able to capture and represent local signal geometry, in order to overcome the inefficiencies of tree based approaches. Parametric modeling, as used in various embodiments of the present principles, is defined as defining at least one partition within an image portion (or macroblock) by implicit or explicit formulation of at least one curve (which, in the particular case of a first degree polynomial, becomes a straight line), and where a particular embodiment of this is to jointly define the partitions and curve according to the so-called "implicit curve" formulation. Formulation of a general curve as used in accordance with the present principles is distinguished from the sixth prior art approach described above in that the sixth prior art approach defines boundaries between sliced partitions within a block as a straight-line connection between two given points located on the periphery of the block.

Given a region or block of a frame to be predicted, a geometric partition mode is tested in addition to those based in classic tree partitioning. The concerned block or region is partitioned into several regions described by one or a set of parametric models. In particular, a form of this can be the partition of blocks or regions into two partitions where their boundary is described by a parametric model or function $f(x, y, \vec{p})$, where x and y represent the coordinate axes, and $\vec{p}$ represents the set of parameters including the information describing the shape of the partition. Once the frame block or region is divided into partitions using $f(x, y, \vec{p})$, each generated partition is predicted by the most appropriate predictor, based on some distortion and coding cost measure trade-off.

The reason that such a partition description is of interest is because in recent studies, tree structures have been demonstrated to be sub-optimal for coding image information. These studies maintain that tree-based coding of images is unable to optimally code heterogeneous regions separated by a regular edge or contour. This problem arises from the fact that tree structures are not able to optimally catch the geometrical redundancy existing along edges, contours or oriented textures. In video sequences, different instances of situations where edges and/or contours need to be coded are common. One of them is when intra coded data is encoded. Boundaries between different kinds of visual data are one of the most relevant kinds of information, e.g., edges and object contours. In inter coded data, contours around moving objects and between regions of differing motion are also of relevant importance.

An embodiment of the present principles provides a technique for general geometric frame partitioning adapted to the geometry of two dimensional (2D) data. Each one of the generated regions is then encoded by using the most efficient type of prediction, e.g., inter and/or intra prediction types. An embodiment includes the generation of geometric partitions in blocks or frame regions. Partition of blocks or frame regions into geometrically adapted partitions, instead of classic trees, allows for a reduction of the amount of information to be sent, as well as the amount of residue generated by the prediction procedure. In accordance with the present principles, a parametric model is used to generate, approximate and/or code the partition boundaries within each block. Such an approach allows for a better capture of the main geometric properties of the 2D data. For example, the model parameters can be defined to independently carry information involving, for example, but not limited to, partition boundary angle, position, discontinuities, and/or even curvature. The use of parametric models, for partition coding, allows for a very compact partition edge description, which minimizes the number of parameters to code. Furthermore, partition model parameters can be defined such as to decouple independent or different geometric information, in order to best code each of the parameters according to their statistics and nature. Such model-based treatment of geometric information also allows for the selective reducing or increasing of the amount of coding information invested per geometric parameter. In addition to coding efficiency, such a feature is useful to control computational complexity while minimizing the impact on coding efficiency.

Figure 5:
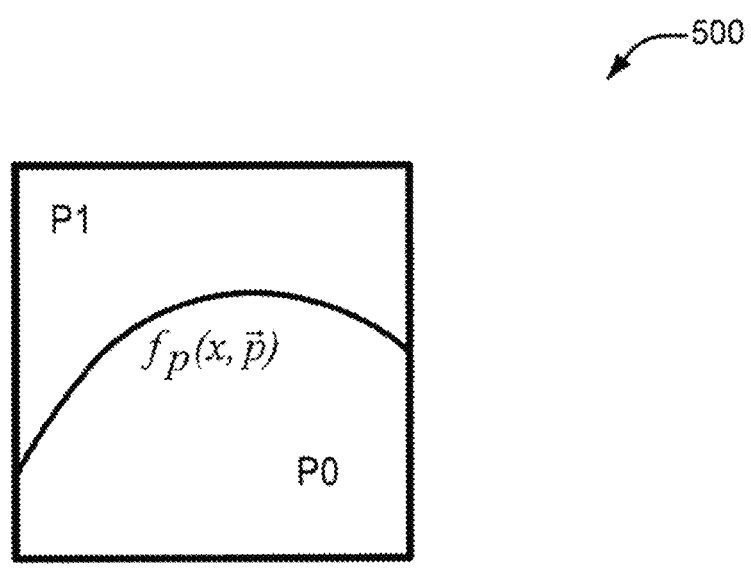
FIG. 5 shows a diagram for a smooth boundary partition based on a polynomial model with partitions P0 and P1, according to an embodiment of the present principles.

One of the advantages of using parametric model based partition descriptions is the possibility to efficiently describe smooth partition boundaries between two partitions in a block. Many times, boundaries between two different moving objects, or edges in an intra frame, can be modeled and finely approximated by some kind of polynomial $f_p(x, y, \vec{p})$. Turning to FIG. 5, a smooth boundary partition based on a polynomial model with partitions P0 and P1 is indicated generally by the reference numeral 500.

For the purpose of geometric image and video coding, the $f(x, y, \vec{p})$ (also expressed as $f(x,y)$ in the following) parameters can be operated such that they describe geometric information such as local angle, position and/or some curvature magnitude. Hence, in the particular case of a first order polynomial $f_{p_i}(x,y,\vec{p})$, block partitions can be represented such that they describe angle and distance with respect to a given set of coordinate axes:

$$f(x,y) = x \cos\theta + y \sin\theta - \rho,$$

where partitions boundary is defined over those positions (x,y) such that $f(x,y)=0$.

Figure 6:
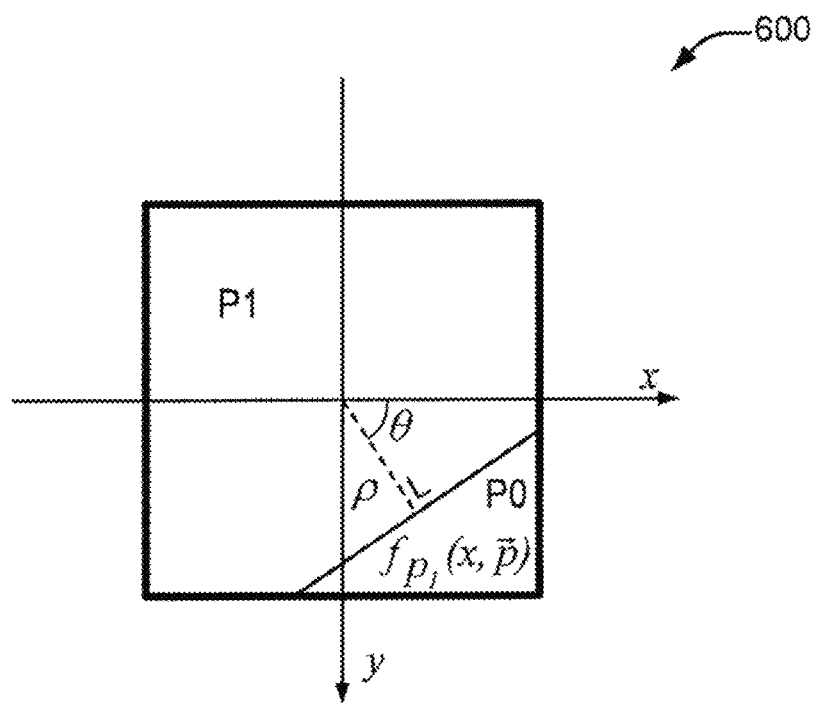
FIG. 6 shows a diagram for an example of using a first order polynomial with parameters described geometry (angle and position) for use as a parametric model, according to an embodiment of the present principles.

Turning to FIG. 6, an example of using a first order polynomial with parameters described geometry (angle and position) for use as a parametric model is indicated generally by the reference numeral 600.

In an embodiment directed to the generation of two regions out of every block, an implicit formulation as follows could be used to describe the partitions:

$$\text{GEO\_Partition} = \begin{cases} \text{if } \int (x, y) > 0 & \text{Partition 0} \\ \text{if } \int (x, y) = 0 & \text{Line Boundary} \\ \text{if } \int (x, y) < 0 & \text{Partition 1} \end{cases}.$$

All pixels located on one side of the zero line ($f(x,y)=0$) are classified as belonging to one partition region (e.g., Partition 1). All pixels located at the other side, are classified in the alternative region (e.g., Partition 0).

Optional Method to Handle Pixels on Partition Boundaries:

Considering the discrete nature of the partitions, we find that on the neighborhoods of the separation line or curve, some pixels can only be considered to partly belong to one or the other partition. This is due to the fact that the parametric model formulation is continuous and the partitions realization is discrete.

Such pixels may be subject to the influence of the predictor used to describe each one of the partition sides. Hence, pixels may be labeled as "partial surface", with a label different from those of Partition 1 and 0. For simplicity, we adopt the convention of labeling pixels in one or the other partition with a 1 or 0. "Partial surface" pixels can be thus identified with some value in between, which may also include the information of how much the concerned pixel is into partition 0 (e.g., a value of 1 would indicate completely, 0.5 would indicate half-half, and 0 would indicate nothing). Of course, the preceding numbering arrangements hereinbefore and throughout are provided for purposes of illustration and clarity and, given the teachings of the present principles provided herein, one of ordinary skill in this and related arts will contemplate these and various other numbering arrangements for use with the present principles, while maintaining the spirit of the present principles. The preceding is formally expressed by the following definition of labeling for Partition 0:

$$\text{Label}(x, y) = \begin{cases} \text{if } f(x, y) >= 0.5 & \text{then } 1 \\ \text{if } 0.5 > f(x, y) > -0.5 & \text{then } f(x, y) + 0.5 \\ \text{if } f(x, y) <= -0.5 & \text{then } 0 \end{cases}$$

Figure 7:
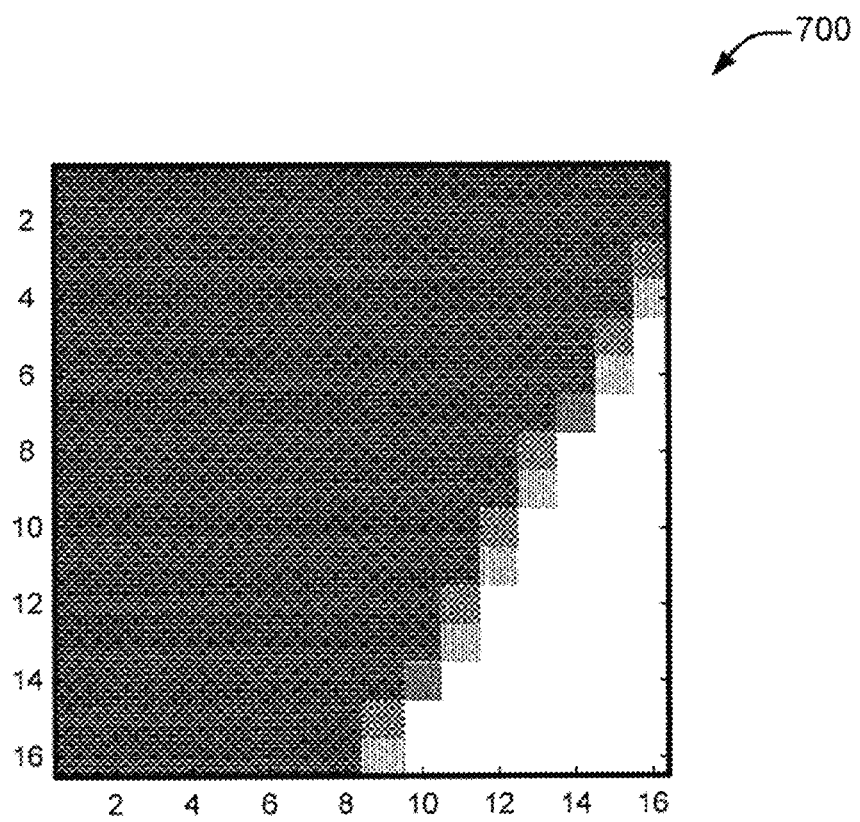
FIG. 7 shows a diagram for a partition mask generated from parametric model f(x,y) using a first degree polynomial, according to an embodiment of the present principles.
Figure 8:
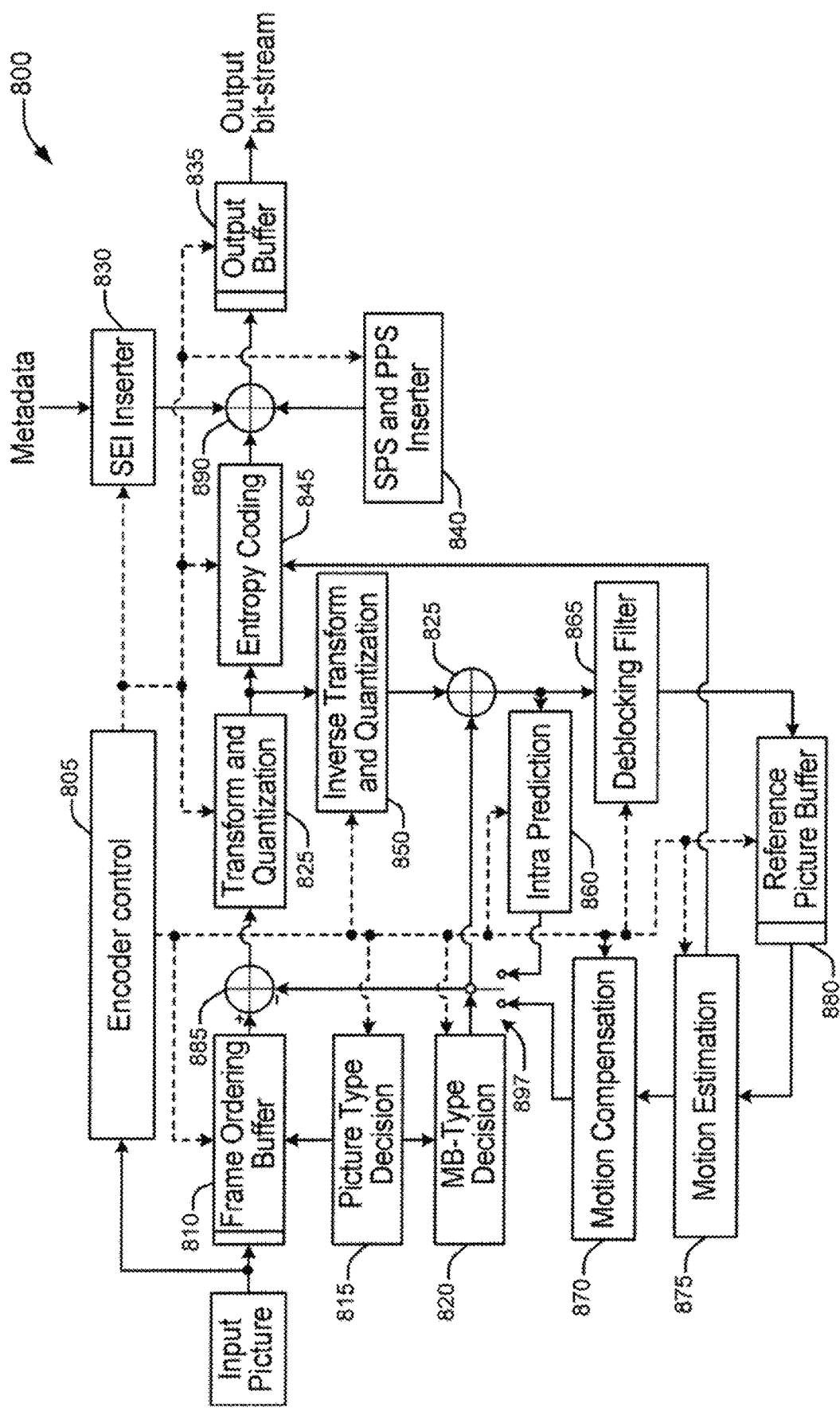
FIG. 8 shows a block diagram for a video encoder capable of performing video encoding in accordance with the MPEG-4 AVC Standard.

Label(x,y)=1 indicates whether that pixel is included within the first partition. Label(x,y)=0 indicates it is in the second partition, the rest of the values state, for that particular pixel, that it is partially classified, indicating also the weight of contribution to that value of the prediction from the first partition. The prediction from the second partition contributes with weight (1−Label(x,y)) to the value of the "partial surface" pixel. This generic pixel classification is generated under the form of a partition mask. Turning to FIG. 7 a partition mask generated from parametric model f(x,y) using a first degree polynomial is indicated generally by the reference numeral 700. As noted above, the floating point numbers stated herein above are just an example of possible selection values. Indeed, depending on f(x,y), threshold values other than 0.5 are possible. Every pixel classified as "partial surface", can be predicted, also, as a function of one or more neighboring pixels within one of the partitions that overlaps it, or a combination of functions of more than one partition overlapping it. Also, it is to be appreciated by one of ordinary skill in this and related arts that any aspect of the present principles described herein may be adapted for integer implementation, and/or making use of look-up tables.

Considerations for Sampling Partition Function, $f(x,y)$, Parameter Space:

Model parameters need to be encoded and transmitted to allow the decoder determining the partition of the concerned block or region. For this purpose, the precision of partition parameters is limited according to the maximum amount of coding cost one is willing to invest for describing blocks or partition regions.

Without loss of generality, a dictionary of possible partitions (or geometric models) is a priori defined by determining the value range and sampling precision for each parameter of $f(x,y)$. In the case of the geometric first order polynomial boundary, for example, this can be defined such that:

$$\rho : \rho \in \left[0, \frac{\sqrt{2} M\, B_{Size}}{2}\right) \text{ and } \rho \subset \{0, \Delta\rho, 2\cdot\Delta\rho, 3\cdot\Delta\rho, ...\},$$

and $$\theta : \begin{cases} \text{if } \rho = 0 & \theta \in [0, 180) \\ \text{else} & \theta \in [0, 360) \end{cases} \text{ and } \theta \subset \{0, \Delta\sigma, 2\cdot\Delta\theta, 3\cdot\Delta\theta, ...\},$$

where $\Delta\rho$ and $\Delta\theta$ are the selected quantization (parameter precision) steps. Nevertheless, an offset in the selected values can be established. The quantized indices for $\theta$ and $\rho$ are the information transmitted to code the partitions shape. However, in the case where vertical and horizontal directional modes (as defined for the MPEG-4 AVC standard) are used as separate coding modes, geometric partitions with $\rho=0$ and angles 0 and 90, are removed from the set of possible partitions configuration. This may save bits as well as reduce complexity.

The decoder needs to know the parameters precision used by the encoder. This can be sent for every type of partition parameter explicitly or implicitly as a function of some already existing data (e.g., the Quantization Parameter in the MPEG-4 AVC standard). Parameters precision can be adapted according to some high level syntax, such as the sequence, picture, and/or slice level.

A video communication system using the region partitioning described herein with respect to the present principles should transmit, for every region using it, the set of necessary encoded parameters to describe the shape of the partition. The rest of the transmitted data, for every geometry encoded region, will be of similar kind to that transmitted by tree based partition modes. Indeed, for each model-based partition, prediction information should be transmitted. Additionally, residual prediction error may also eventually be encoded after prediction.

The use of parametric, model based, geometric regions partitioning influences all the processes in a video encoder/decoder that depend on the partitioning of the frame. Some of the more common processes/modules in video systems able to profit from the present principles, and that may be adapted to the present principles, include, but are not limited to: general control of the encoder/decoder; region prediction (motion compensation/intra data prediction); motion estimation; entropy coding/decoding; and in-loop filtering for artifacts reduction.

Hereinafter, an embodiment is described with respect to the MPEG-4 AVC Standard framework. However, it is to be appreciated that the present principles are not limited solely to the MPEG-4 AVC and may be readily utilized with respect to other video coding standards and recommendations, while maintaining the spirit of the present principles. Extension of the MPEG-4 AVC Standard Video Encoder and Decoder to Consider Parametric Model Partitions in Accordance with the Present Principles:

An embodiment will now be described relating to an extension of the MPEG-4 AVC Standard in accordance with the present principles. The MPEG-4 AVC Standard relies on tree-based frame partitioning in order to optimize coding performance. Extending the MPEG-4 AVC Standard in accordance with an embodiment of the present principles helps to overcome the limitations inherent to tree-based frame partitioning to which the MPEG-4 AVC Standard is subject.

The use of parametric model-based region partitioning can be included in the MPEG-4 AVC Standard under the form of new block coding modes. The MPEG-4 AVC Standard tree-based frame partitioning divides each picture, when and where needed, in 16×16, 16×8, 8×16, 8×8, 8×4, 4×8 and 4×4 blocks. Each of these partition types is associated with a coding mode, that at the same time, depending on the mode, can be of the type inter or intra. In addition to these block partition modes, we introduce an additional partition block mode such that a parametric model $f(x,y)$ is used to describe the partition within the block. Such a block mode partitioned with a parametric model is referred to herein as "Geometric Mode". The goal is to generate partitions as big as possible; hence, the purpose of the parametric model is to be applied to 16×16 size blocks or to unions of leaves of tree-based partitions. However, when compression efficiency is of concern, 8×8 "Geometric Mode" blocks are also considered. The use of 8×8 "Geometric Mode" blocks may also be enabled or disabled depending on complexity factors. A high level syntax can be signaled in order to indicate whether 8×8 "Geometric modes" are used or not. This can save coding overhead when such a mode is unused. Particular examples of syntax level include, but are not limited to, a sequence, picture and/or slice level.

In order to insert such a new family of coding modes, the encoder and/or decoder can be modified. As depicted in FIGS. 8, 9, 10, and 11, functionality of the main building blocks in the MPEG-4 AVC Standard can be modified and extended in order to handle the new modes, able to capture and code geometric information.

Figure 9:
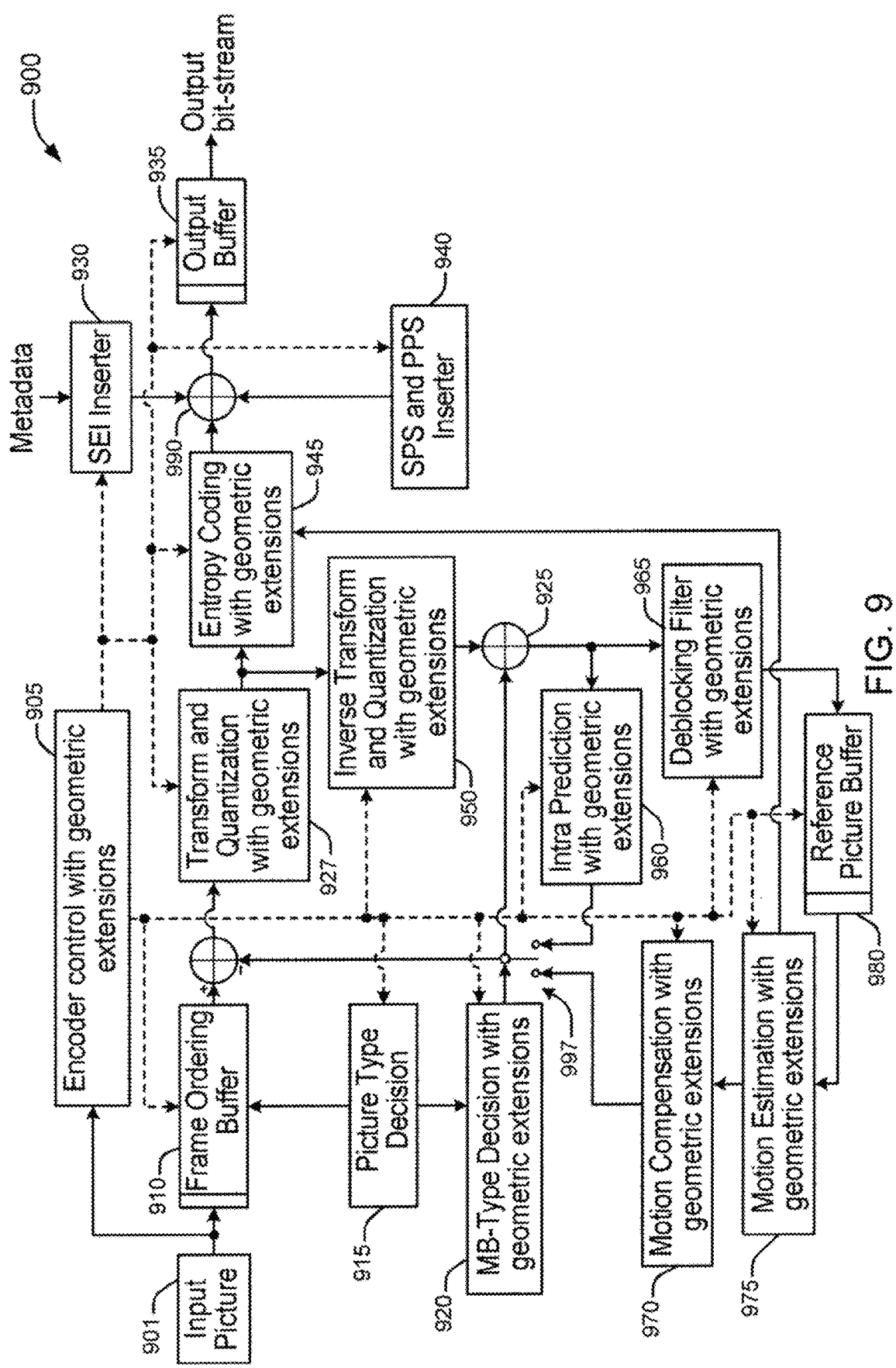
FIG. 9 shows a block diagram for a video encoder capable of performing video encoding in accordance with the MPEG-4 AVC Standard, extended for use with the present principles, according to an embodiment of the present principles.
Figure 10:
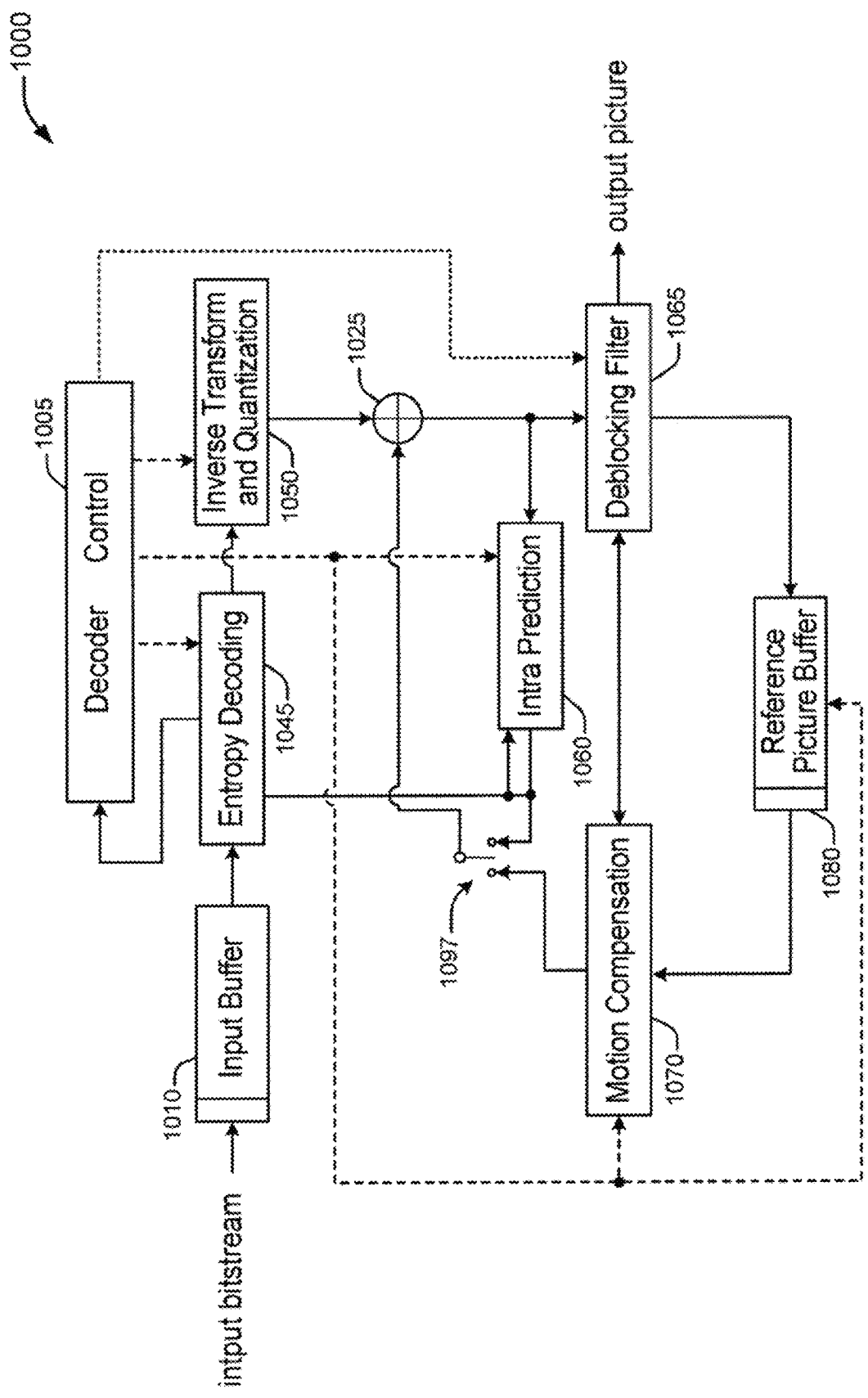
FIG. 10 shows a block diagram for a video decoder capable of performing video decoding in accordance with the MPEG-4 AVC Standard.

Turning to FIG. 9, a video encoder capable of performing video encoding in accordance with the MPEG-4 AVC standard, extended for use with the present principles, is indicated generally by the reference numeral 900.

The video encoder 900 includes a frame ordering buffer 910 having an output in signal communication with a non-inverting input of a combiner 985. An output of the combiner 985 is connected in signal communication with a first input of a transformer and quantizer with geometric extensions 927. An output of the transformer and quantizer with geometric extensions 927 is connected in signal communication with a first input of an entropy coder with geometric extensions 945 and a first input of an inverse transformer and inverse quantizer 950. An output of the entropy coder with geometric extensions 945 is connected in signal communication with a first non-inverting input of a combiner 990. An output of the combiner 990 is connected in signal communication with a first input of an output buffer 935.

A first output of an encoder controller with geometric extensions 905 is connected in signal communication with a second input of the frame ordering buffer 910, a second input of the inverse transformer and inverse quantizer 950, an input of a picture-type decision module 915, an input of a macroblock-type (MB-type) decision module with geometric extensions 920, a second input of an intra prediction module with geometric extensions 960, a second input of a deblocking filter with geometric extensions 965, a first input of a motion compensator with geometric extensions 970, a first input of a motion estimator with geometric extensions 975, and a second input of a reference picture buffer 980.

A second output of the encoder controller with geometric extensions 905 is connected in signal communication with a first input of a Supplemental Enhancement Information (SEI) inserter 930, a second input of the transformer and quantizer with geometric extensions 927, a second input of the entropy coder with geometric extensions 945, a second input of the output buffer 935, and an input of the Sequence Parameter Set (SPS) and Picture Parameter Set (PPS) inserter 940.

A first output of the picture-type decision module 915 is connected in signal communication with a third input of a frame ordering buffer 910. A second output of the picture-type decision module 915 is connected in signal communication with a second input of a macroblock-type decision module with geometric extensions 920.

An output of the Sequence Parameter Set (SPS) and Picture Parameter Set (PPS) inserter 940 is connected in signal communication with a third non-inverting input of the combiner 990.

An output of the inverse quantizer and inverse transformer 950 is connected in signal communication with a first non-inverting input of a combiner 925. An output of the combiner 925 is connected in signal communication with a first input of the intra prediction module with geometric extensions 960 and a first input of the deblocking filter with geometric extensions 965. An output of the deblocking filter with geometric extensions 965 is connected in signal communication with a first input of a reference picture buffer 980. An output of the reference picture buffer 980 is connected in signal communication with a second input of the motion estimator with geometric extensions 975. A first output of the motion estimator with geometric extensions 975 is connected in signal communication with a second input of the motion compensator with geometric extensions 970. A second output of the motion estimator with geometric extensions 975 is connected in signal communication with a third input of the entropy coder with geometric extensions 945.

An output of the motion compensator with geometric extensions 970 is connected in signal communication with a first input of a switch 997. An output of the intra prediction module 860 is connected in signal communication with a second input of the switch 997. An output of the macroblock-type decision module with geometric extensions 920 is connected in signal communication with a third input of the switch 997. An output of the switch 997 is connected in signal communication with a second non-inverting input of the combiner 925 and with an inverting input of the combiner 985.

Inputs of the frame ordering buffer 910 and the encoder controller with geometric extensions 905 are available as input of the encoder 900, for receiving an input picture 901. Moreover, an input of the Supplemental Enhancement Information (SEI) inserter 930 is available as an input of the encoder 900, for receiving metadata. An output of the output buffer 935 is available as an output of the encoder 900, for outputting a bitstream.

Figure 11:
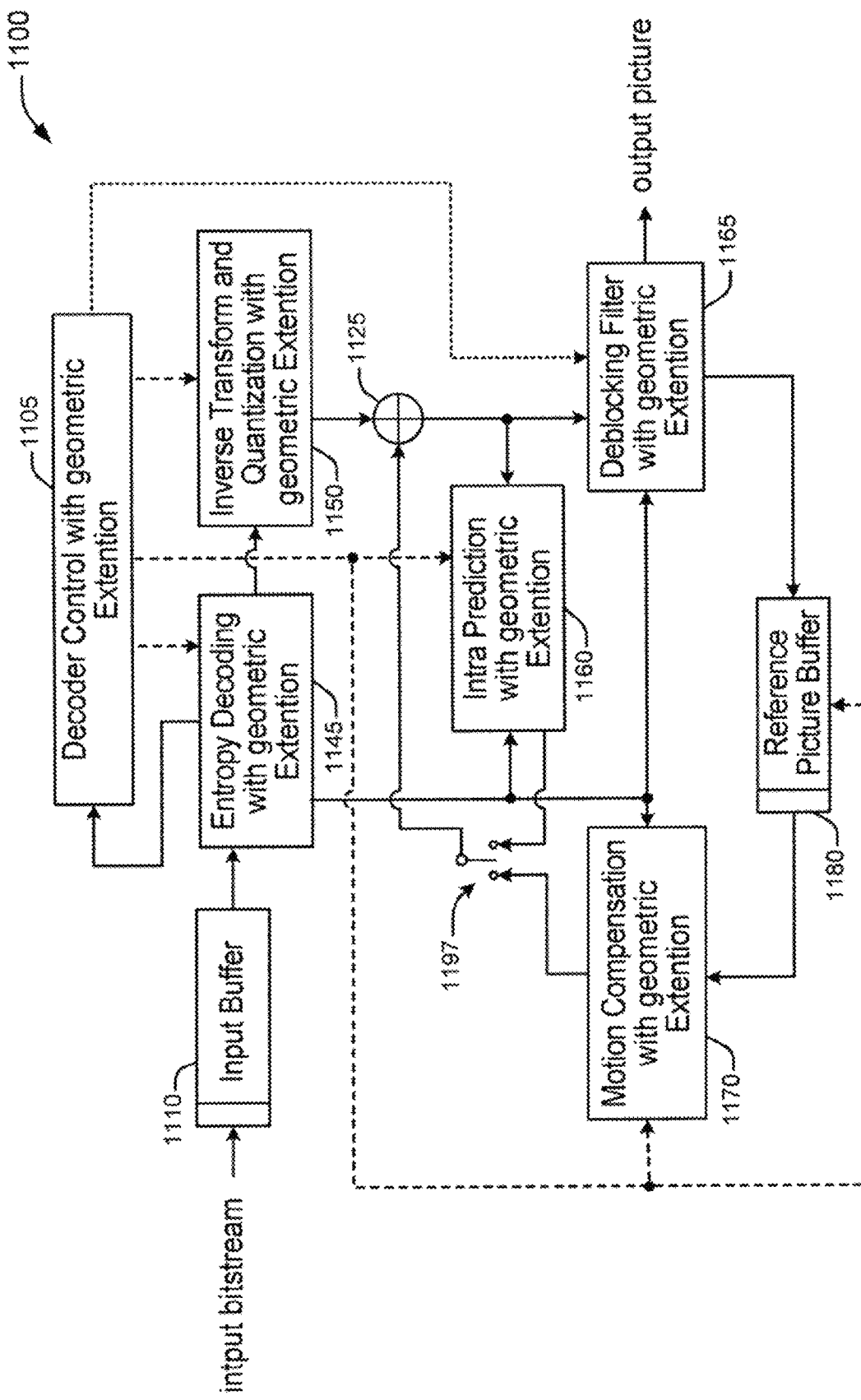
FIG. 11 shows a block diagram for a video decoder capable of performing video decoding in accordance with the MPEG-4 AVC Standard, extended for use with the present principles, according to an embodiment of the present principles.

Turning to FIG. 11, a video decoder capable of performing video decoding in accordance with the MPEG-4 AVC standard, extended for use with the present principles, is indicated generally by the reference numeral 1100.

The video decoder 1100 includes an input buffer 1110 having an output connected in signal communication with a first input of an entropy decoder with geometric extensions 1145. A first output of the entropy decoder with geometric extensions 1145 is connected in signal communication with a first input of an inverse transformer and inverse quantizer with geometric extensions 1150. An output of the inverse transformer and inverse quantizer with geometric extensions 1150 is connected in signal communication with a second non-inverting input of a combiner 1125. An output of the combiner 1125 is connected in signal communication with a second input of a deblocking filter with geometric extensions 1165 and a first input of an intra prediction module with geometric extensions 1160. A second output of the deblocking filter with geometric extensions 1165 is connected in signal communication with a first input of a reference picture buffer 1180. An output of the reference picture buffer 1180 is connected in signal communication with a second input of a motion compensator with geometric extensions 1170.

A second output of the entropy decoder with geometric extensions 1145 is connected in signal communication with a third input of the motion compensator with geometric extensions 1170 and a first input of the deblocking filter with geometric extensions 1165. A third output of the entropy decoder with geometric extensions 1145 is connected in signal communication with an input of a decoder controller with geometric extensions 1105. A first output of the decoder controller with geometric extensions 1105 is connected in signal communication with a second input of the entropy decoder with geometric extensions 1145. A second output of the decoder controller with geometric extensions 1105 is connected in signal communication with a second input of the inverse transformer and inverse quantizer with geometric extensions 1150. A third output of the decoder controller with geometric extensions 1105 is connected in signal communication with a third input of the deblocking filter with geometric extensions 1165. A fourth output of the decoder controller with geometric extensions 1105 is connected in signal communication with a second input of the intra prediction module with geometric extensions 1160, with a first input of the motion compensator 1170, and with a second input of the reference picture buffer 1180.

An output of the motion compensator with geometric extensions 1170 is connected in signal communication with a first input of a switch 1197. An output of the intra prediction module with geometric extensions 1160 is connected in signal communication with a second input of the switch 1197. An output of the switch 1197 is connected in signal communication with a first non-inverting input of the combiner 1125.

An input of the input buffer 1110 is available as an input of the decoder 1100, for receiving an input bitstream. A first output of the deblocking filter with geometric extensions 1165 is available as an output of the decoder 1100, for outputting an output picture.

Regarding a possible modification/extension relating to the use of the present principles with respect to the MPEG-4 AVC Standard, encoder and/or decoder control modules may be modified/extended to include all the decision rules and coding processes structure necessary for "Geometric Modes".

Regarding another possible modification/extension relating to the use of the present principles with respect to the MPEG-4 AVC Standard, the motion compensation module may be adapted in order to compensate blocks with arbitrary partitions described by $f(x,y)$ and its parameters.

Regarding yet another possible modification/extension relating to the use of the present principles with respect to the MPEG-4 AVC Standard, the motion estimation module may be adapted in order to test and select the most appropriate motion vectors for the different sorts of partitions available in the parametric model-based coding mode.

Regarding still another possible modification/extension relating to the use of the present principles with respect to the MPEG-4 AVC Standard, intra frame prediction may be adapted in order to consider parametric model-based block partitioning with the possibility to select the most appropriate prediction mode in each partition.

Regarding a further possible modification/extension relating to the use of the present principles with respect to the MPEG-4 AVC Standard, the deblocking in-loop filter module may be adapted in order to handle the more complicate shape of motion regions within blocks with parametric model-based partitions.

Regarding a yet further possible modification/extension relating to the use of the present principles with respect to the MPEG-4 AVC Standard, entropy coding and/or decoding may be adapted and extended in order to code and/or decode the new data associated with the parametric model-based mode. Moreover, motion prediction may be adapted in order to handle the more complicate shape of motion regions. Predictors for efficiently coding parametric model-based partition parameters may also be generated and used.

Encoder Specific Blocks:
Encoder Control:

The encoder control module may be extended in order to take into account the new modes based on the parametric model-based block partition. These modes (called Geometric Modes) are inserted within the existing ones in the MPEG-4 AVC standard. In the particular case of inter modes for motion compensation, 16×16 and 8×8 parametric model-based partitioned blocks. Each of these modes is, respectively, inserted within the Macroblock-size modes and within the sub-Macroblock-size modes. By structural similarity, these modes are logically inserted before, between, or after 16×8 and/or 8×16 for the Geometric 16×16 Mode, and before, between, or after 8×4 and/or 4×8 for the Geometric 8×8 Mode. In an example implementation, in order to allow a low-cost usage of 16×8 and 8×16, as well as, 8×4 and 4×8 modes for low bit-rate, 16×16 and 8×8 Geometric Modes are inserted right after their MPEG-4 AVC directional homologues. According to their global usage statistics, we can also insert them right before the MPEG-4 AVC directional modes (and sub-modes), as shown in TABLE 1 and TABLE 2.

TABLE 1

| Macroblock Modes | Sub-Macroblock Modes: |
| --- | --- |
| 16 × 16 block | 8 × 8 block |
| 16 × 8 block | 8 × 4 block |
| 8 × 16 block | 4 × 8 block |
| 16 × 16 Geometric block | 8 × 8 Geometric block |
| 8 × 8 Sub-macroblock | 4 × 4 block |
| . . . | |

TABLE 2

| Macroblock Modes: | Sub-Macroblock Modes: |
| --- | --- |
| 16 × 16 block | 8 × 8 block |
| 16 × 16 Geometric block | 8 × 8 Geometric block |
| 16 × 8 block | 8 × 4 block |
| 8 × 16 block | 4 × 8 block |
| 8 × 8 Sub-macroblock | 4 × 4 block |
| . . . | |

Motion Estimation:

The motion estimation module may be adapted to handle, when needed, geometry adapted block partitions. As an example, in Geometric Mode, motion is described in the same way as for classic tree based partition modes 16×8, 8×16, 8×4 or 4×8. Indeed, these modes may function like some particular instances of the present parametric model-based partition mode. As such, they are excluded from the possible configurations of the parametric model in use. Every partition can be modeled with one or multiple references, depending on the needs, and whether a P or B block is being coded.

P-mode example: In a full P-mode parametric model-based partitioned block, both partitions are modeled by a matching patch selected from a reference frame. Each patch must have a shape tailored to fit the selected geometric partition. In the same way as in P macroblocks and P sub-macroblocks, a motion vector is transmitted per partition. In one example of this, motion vectors as well as $f(x,y)$ model parameters are selected such that the information included in the block is best described in terms of some distortion measure (D) and some coding cost measure (R). For this purpose, all parameters are jointly optimized for each block such that D and R are jointly minimized:

$$\{MV_1, MV_0, \theta, \rho\} = \underset{\substack{MV_1 \in \Omega_{MV_1}, MV_0 \in \Omega_{MV_0} \\ \theta \in \Omega_\theta, \rho \in \Omega_\rho}}{\arg\min} D(MV_1, MV_0, \theta, \rho) + \lambda R(MV_1, MV_0, \theta, \rho),$$

where $\lambda$ is a multiplying factor, $MV_1$ and $MV_0$ stand for both motion vectors in the partition, $\theta$ and $\rho$ represent partition parameters for the particular case of the first order polynomial and each $\Omega_x$ represents the set of valid values for each kind of information.

An example of the adaptation of a distortion measure for use with one or more embodiments of the present principles is the use of the generated masks for each partition (see mask example in FIG. 7). Then, any classic block-based distortion measure can be modified to take partitions into account, such that:

$$D(MV_1, MV_0, \theta, \rho) = \sum_{\vec{x} \in block} D\left(I(\vec{x}), \hat{I}'(\vec{x} - MV_1)\right) \cdot \mathrm{MASK}_{P1}(x, y) +$$

$$\sum_{\vec{x} \in block} D\left(I(\vec{x}), \hat{I}'(\vec{x} - MV_0)\right) \cdot \mathrm{MASK}_{P0}(x, y)$$

In the expression above, $\mathrm{MASK}_{P1}(x,y)$ and $\mathrm{MASK}_{P0}(x,y)$ respectively represent each of the $f(x,y)$ partitions. Fast implementations of this are possible by reducing the number of addition operations for those mask values being very small (for example, smaller than a given threshold (such as, for example, 0.5) to zero. An example of such a simplification can also be to generate a simplified mask where all values equal or smaller than 0.5 are rounded to zero and all values greater than 0.5 are rounded to one. Then, in an embodiment, only those positions where the mask is 1 are summed to compute the distortion. In such a case, only addition operations are necessary and all positions with zero value in each mask can be ignored.

Figure 16:
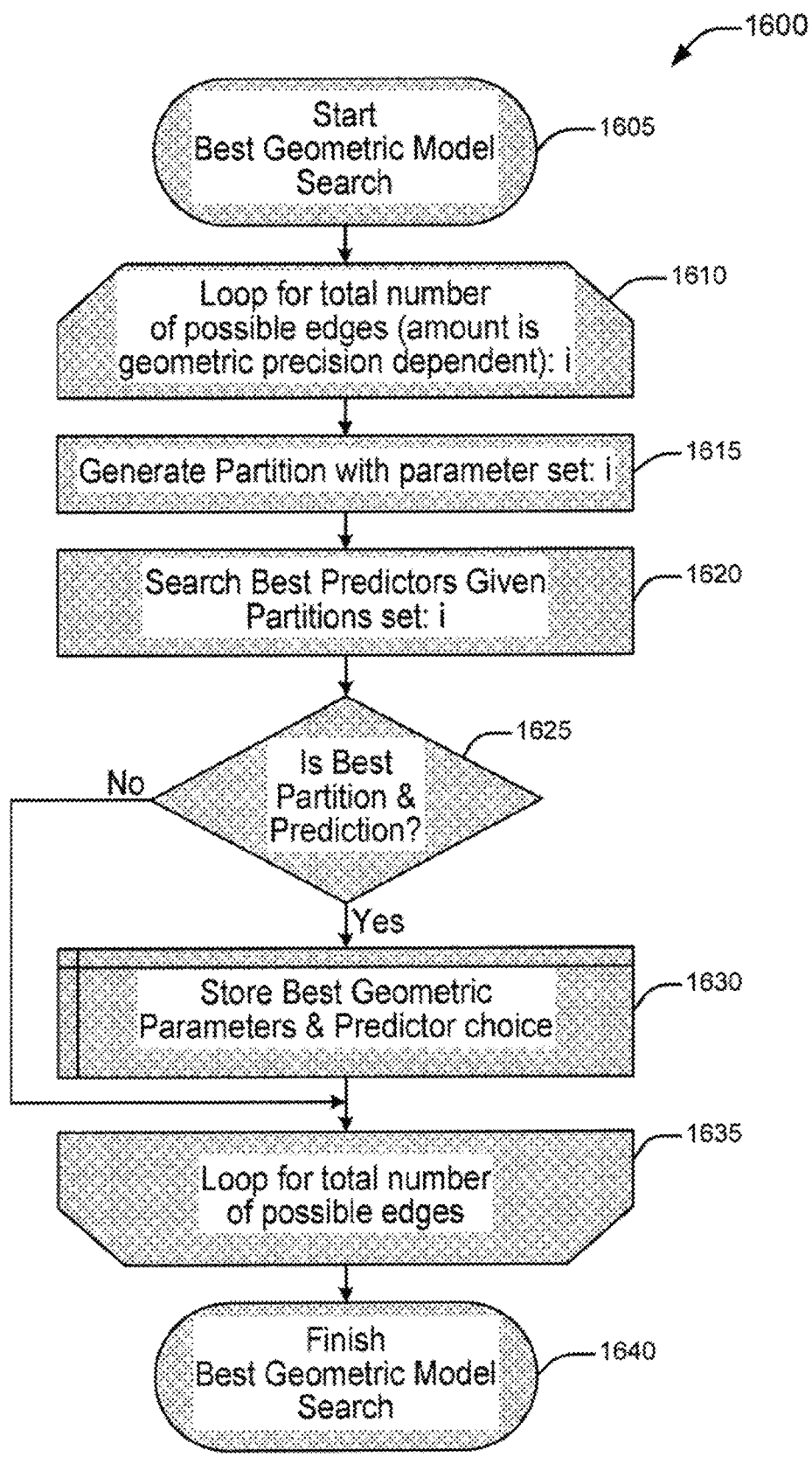
FIG. 16 shows a diagram for an exemplary method for geometric modes estimation with model-based partition parameters and prediction search, according to an embodiment of the present principles.

In an embodiment, in addition to performing a motion search at every partition, partitions themselves should be determined together with the motion information. Hence, a search is performed on $f(x,y)$ parameters as well. Turning to FIG. 16, an exemplary method for geometric modes estimation with model-based partition parameters and prediction search (e.g., motion vectors search for motion estimation) is indicated generally by the reference numeral 1600.

The method 1600 includes a start block 1605 that passes control to a loop limit block 1610. The loop limit block 1610 performs a loop for a total number of possible edges (wherein the amount of edges is geometric precision dependent), and initializes a variable i, and passes control to a function block 1615. The function block 1615 generates a partition with a parameter set i, and passes control to a function block 1620. The function block 1620 searches the best predictors given partitions set i, and passes control to a decision block 1625. The decision block 1625 determines whether the best partition and the best prediction have been determined. If so, then control is passed to a function block 1630. Otherwise, control is passed to a loop limit block 1635.

The function block 1630 stores the best geometric parameters and the predictor choice, and passes control to the loop limit block 1635.

The loop limit block 1635 ends the loop for the total number of possible edges, and passes control to an end block 1640.

In case the use of several possible types of models for block partition is desired, motion estimation may involve testing the different models in order to find the best model adapted to the data. Selection of the best model at the decoder side may be handled by sending the necessary side information.

Entropy Coding:

Entropy Coding may be extended in order to code geometric parameters according to their statistics as well as prediction models from neighboring encoded-decoded blocks which may themselves include geometric partitions information. Motion vector predictors for blocks partitioned with parametric models are adapted to the geometry of their respective partitioned block as well as to that of the neighboring, already encoded blocks. Each geometric partition motion vector is predicted from an adaptively selected set of motion vectors from spatial and/or temporal neighboring blocks. An embodiment of this is the use, depending on the geometry of the current block partition, of 1 or 3 spatial neighbors. When the number of motion vectors is 3, these are median filtered. Then, predicted motion vectors are coded according to the MPEG-4 AVC Standard, either using variable length coding (VLC) or arithmetic coding (AC) based coding.

Two exemplary coding approaches for model-based partition parameters will now be described.

In a first exemplary coding approach for model-based partition parameters, such parameters are coded without prediction when no neighboring model-based (or geometric) block exist. Then, for the first order polynomial case, in one embodiment of variable length coding, angles can be coded with uniform codes and the radius can use a Golomb code.

In a second exemplary coding approach for model-based partition parameters, such parameters are coded with prediction when at least one neighboring model-based (or geometric) blocks exists. An embodiment of parameter prediction is performed by projecting the parametric models from previous neighboring blocks into the current block. Indeed, for the first degree polynomial case, an example is to predict parameters by continuing the line of a previous block into the current block. When two blocks are available, then, the predicted line is the one connecting both crossing points of neighboring lines with macroblock boundaries.

Figure 13:
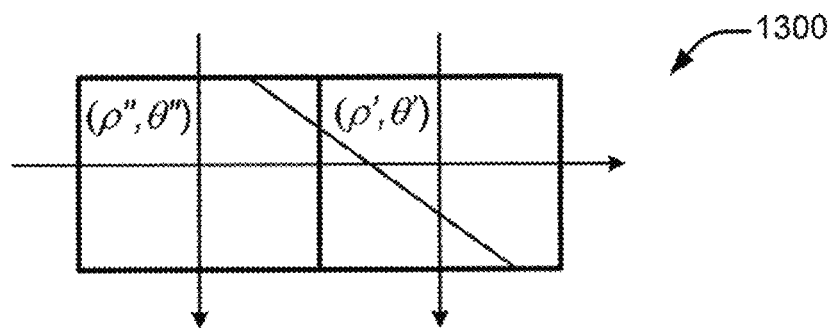
FIG. 13 shows a diagram for an example of partition parameters prediction for the right block from parameters of the left block, according to an embodiment of the present principles.

Turning to FIG. 13, an example of partition parameters prediction for the right block from parameters of the left block is indicated generally by the reference numeral 1300.

Figure 14:
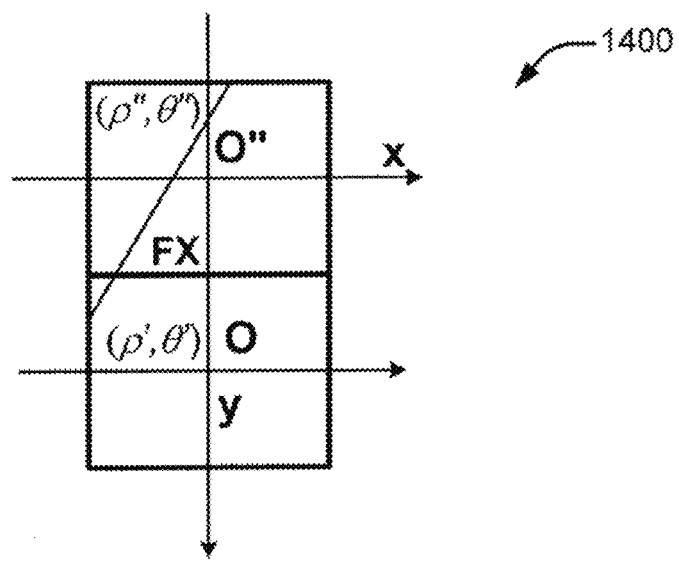
FIG. 14 shows a diagram for an example of partition parameters prediction for the lower block from parameters of the upper block, according to an embodiment of the present principles.

Turning to FIG. 14, an example of partition parameters prediction for the lower block from parameters of the upper block is indicated generally by the reference numeral 1400.

Figure 15:
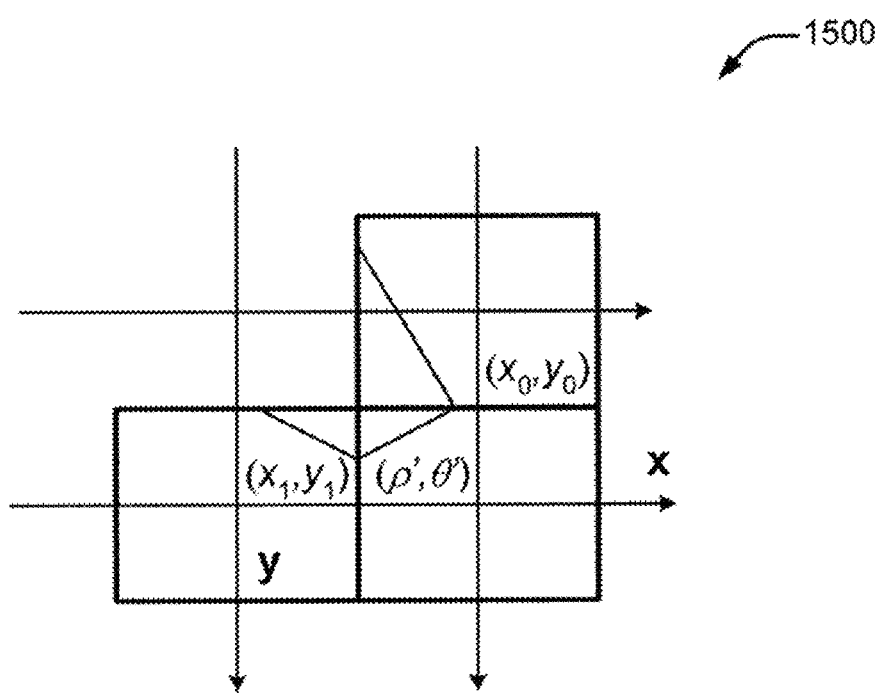
FIG. 15 shows a diagram for an example of partition parameters prediction for the right block from parameters of the upper and left blocks, according to an embodiment of the present principles.

Turning to FIG. 15, an example of partition parameters prediction for the right block from parameters of the upper and left blocks is indicated generally by the reference numeral 1500.

Predicted parameters are then coded differentially using Golomb codes. In the particular case of angle, its periodicity property may be exploited in order to have the best possible statistics for posterior VLC or AC coding. In one example of VLC, one can use Golomb codes.

Figure 17:
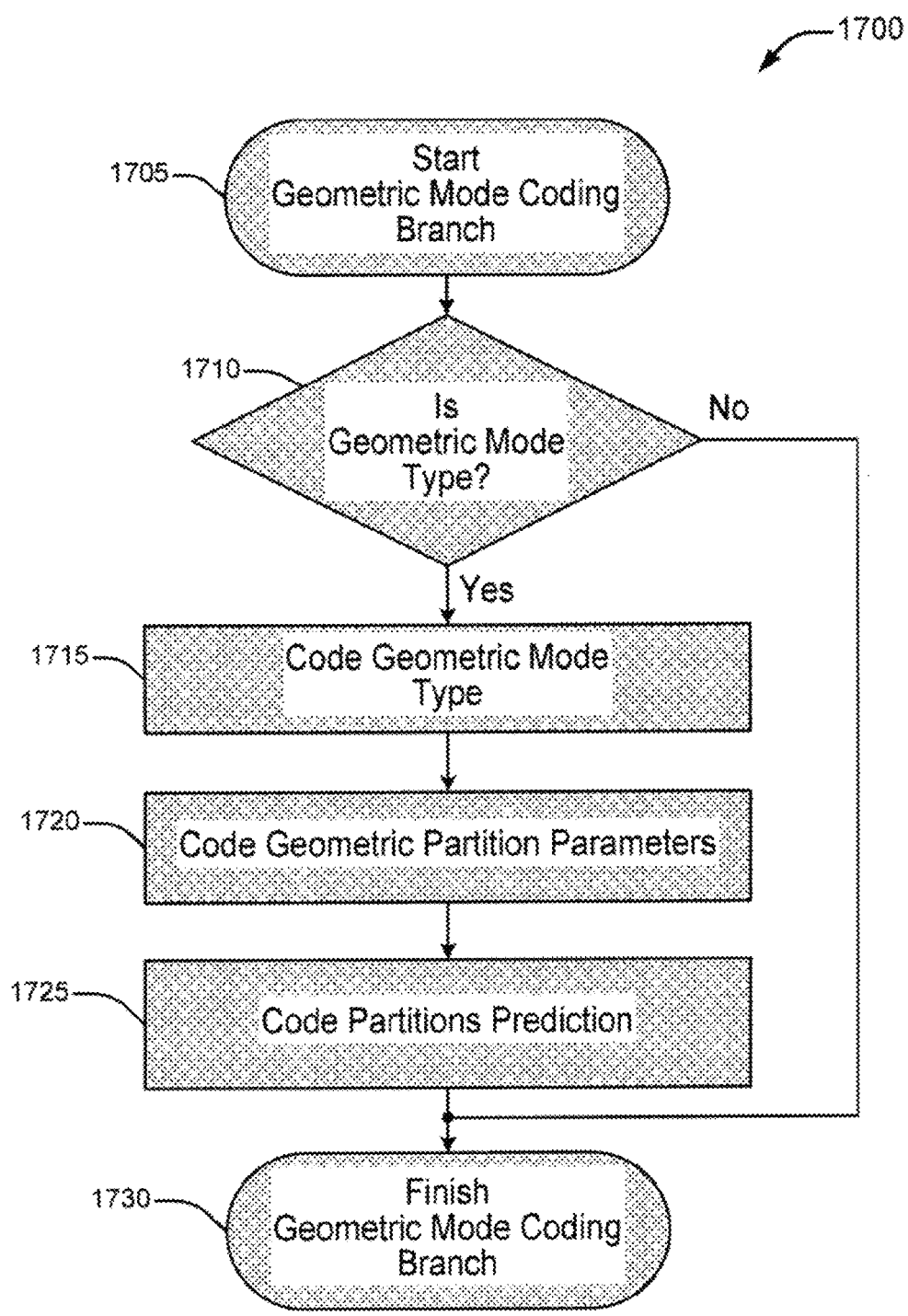
FIG. 17 shows a flow diagram for an exemplary method for coding a geometrically partitioned prediction block, according to an embodiment of the present principles.
Figure 18A:
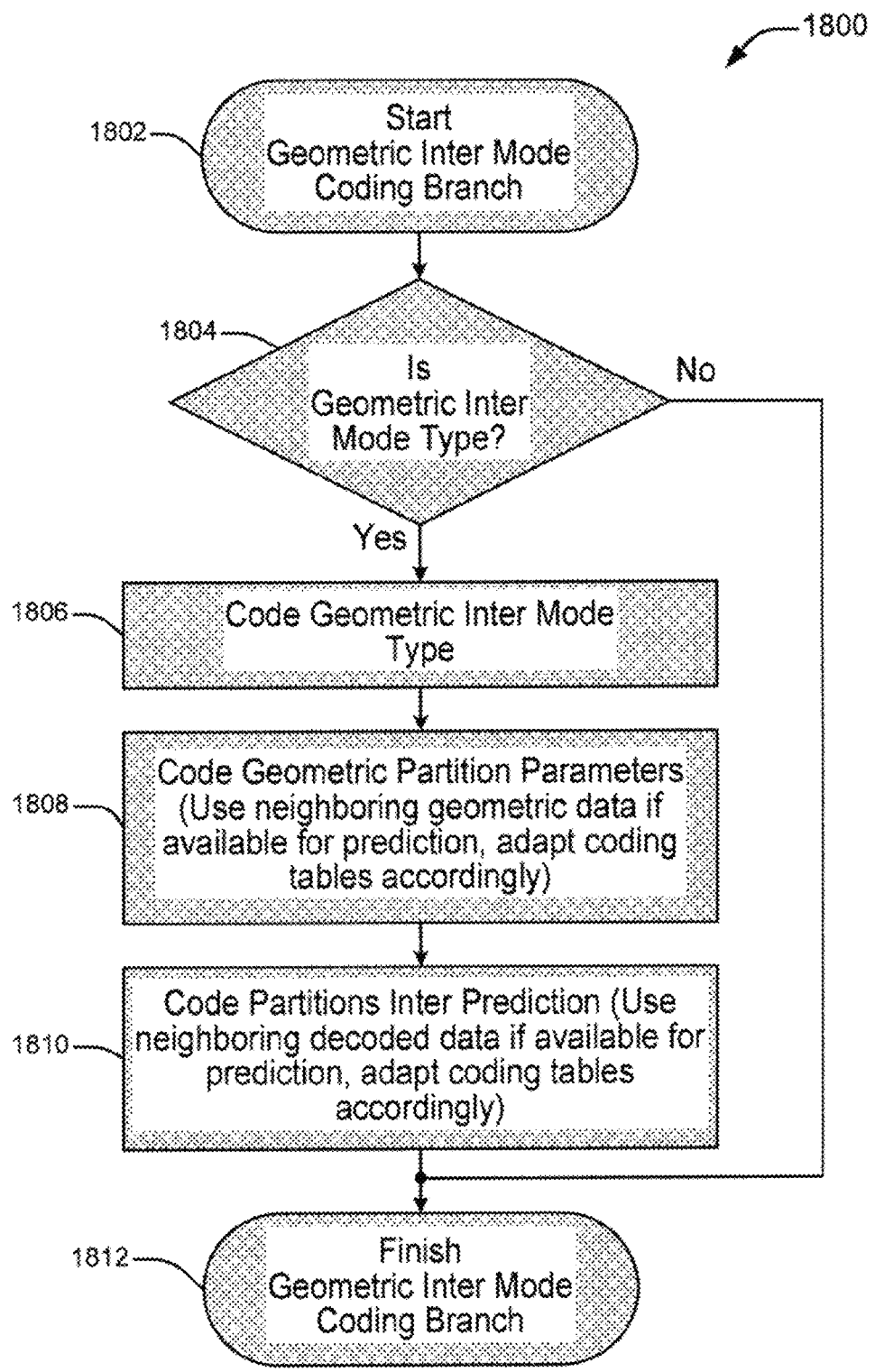
FIG. 18A shows a flow diagram for an exemplary method for coding a geometrically partitioned inter prediction block, according to an embodiment of the present principles.
Figure 18B:
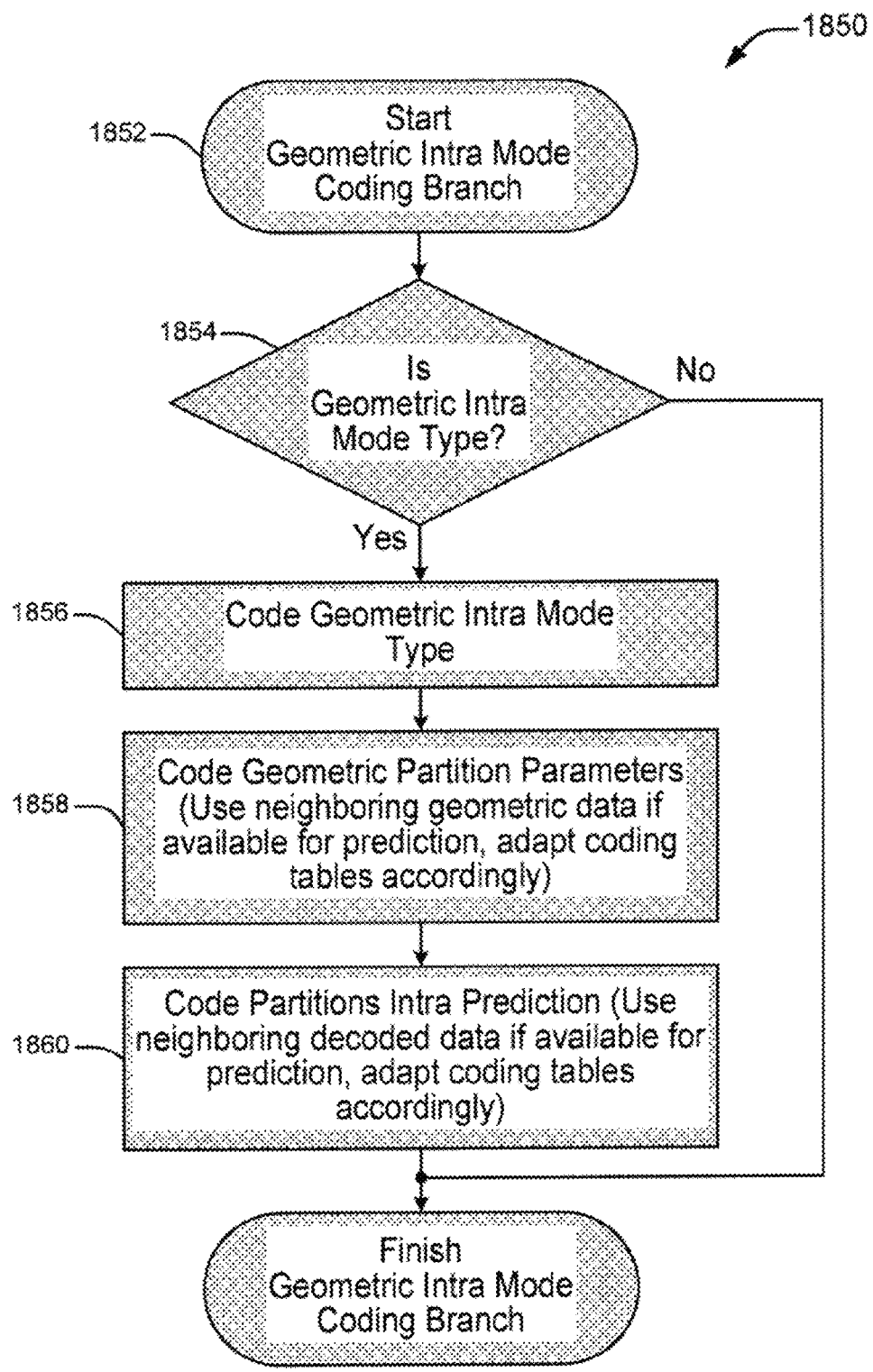
FIG. 18B shows a flow diagram for an exemplary method for coding a geometrically partitioned intra prediction block, according to an embodiment of the present principles.
Figure 19:
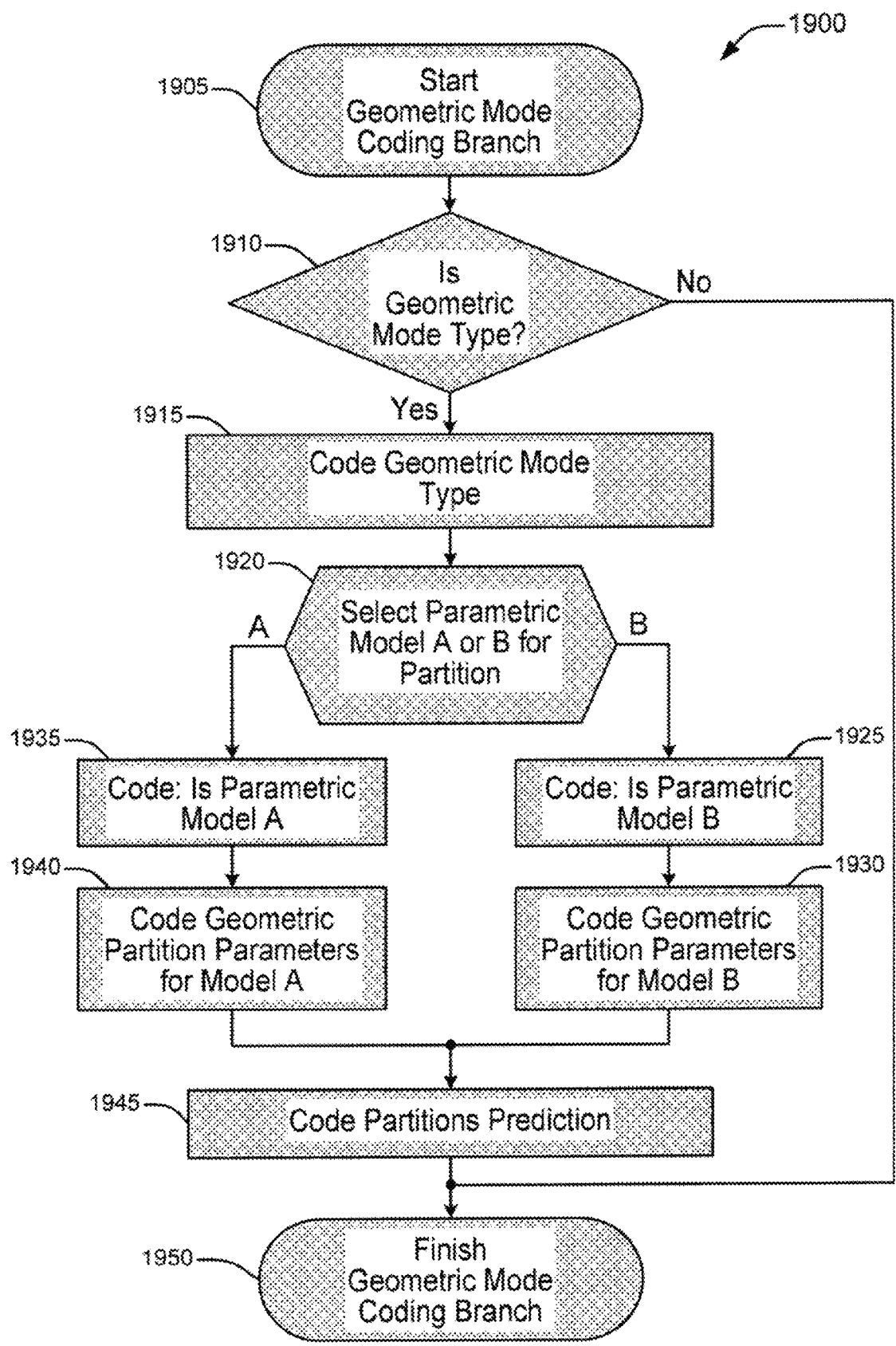
FIG. 19 shows a flow diagram for an exemplary method for coding with multiple types of models, according to an embodiment of the present principles.

Relating to the coding procedure structure of a geometric block mode, FIGS. 17, 18, and 19 depict a particular embodiment of coding flowcharts for general parametric model based blocks. Indeed, in order to code parametric model-based blocks, in addition to motion data, at some point of the block coding procedure, partition parameters are to be encoded.

Turning to FIG. 17, an exemplary method for coding a geometrically partitioned prediction block is indicated generally by the reference numeral 1700.

The method 1700 includes a start block 1705 that passes control to a decision block 1710. The decision block 1710 determines whether or not the current mode type is a geometric mode type. If so, then control is passed to a function block 1715. Otherwise, control is passed to an end block 1730.

The function block 1715 codes the geometric mode type, and passes control to a function block 1720. The function block 1720 codes the geometric partition parameters, and passes control to a function block 1725. The function block 1725 codes the partitions prediction, and passes control to the end block 1730.

Turning to FIG. 18A, an exemplary method for coding a geometrically partitioned inter prediction block is indicated generally by the reference numeral 1800.

The method 1800 includes a start block 1802 that passes control to a decision block 1804. The decision block 1804 determines whether or not the current mode type is a geometric inter mode type. If so, then control is passed to a function block 1806. Otherwise, control is passed to an end block 1812.

The function block 1806 codes the geometric inter mode type, and passes control to a function block 1808. The function block 1808 codes the geometric partition parameters (for example, using neighboring geometric data if available for prediction, and adapting coding tables accordingly), and passes control to a function block 1810. The function block 1810 codes the partitions inter prediction (for example, using neighboring decoded data if available for prediction, and adapting coding tables accordingly), and passes control to the end block 1812.

Turning to FIG. 18B, an exemplary method for coding a geometrically partitioned intra prediction block is indicated generally by the reference numeral 1850.

The method 1850 includes a start block 1852 that passes control to a decision block 1854. The decision block 1854 determines whether or not the current mode type is a geometric inter mode type. If so, then control is passed to a function block 1856. Otherwise, control is passed to an end block 1862.

The function block 1856 codes the geometric inter mode type, and passes control to a function block 1858. The function block 1858 codes the geometric partition parameters (for example, using neighboring geometric data if available for prediction, and adapting coding tables accordingly), and passes control to a function block 1860. The function block 1860 codes the partitions inter prediction (for example, using neighboring decoded data if available for prediction, and adapting coding tables accordingly), and passes control to the end block 1862.

Turning to FIG. 19, an exemplary method for coding with multiple types of models is indicated generally by the reference numeral 1900.

The method 1900 includes a start block 1905 that passes control to a decision block 1910. The decision block 1910 determines whether or not the current mode type is a geometric mode type. If so, then control is passed to a function block 1915. Otherwise, control is passed to an end block 1950.

The function block 1915 codes the geometric mode type, and passes control to a preparation block 1920. The preparation block 1920 selects parametric model A or B for the current partition. If parametric model A is selected, then control is passed to a function block 1935. Otherwise, if parametric model B is selected, then control is passed to a function block 1925.

The function block 1935 designates the code to correspond to parametric model A, and passes control to a function block 1940. The function block 1940 codes the geometric partition parameters for parametric model A, and passes control to a function block 1945.

The function block 1925 designates the code to correspond to parametric model B, and passes control to a function block 1930. The function block 1930 codes the geometric partition parameters for parametric model B, and passes control to the function block 1945.

The function block 1945 codes the partitions prediction, and passes control to the end block 1950.

Encoder/Decoder Shared Blocks:
Motion Compensation:

The motion compensation module may be extended in order to compensate the non-squared/non-rectangular partitions in parametric model-based partitioned blocks. Block reconstruction for the motion compensation procedure directly follows from the motion estimation procedure described herein above. Indeed, compensation corresponds to use as a predictor the best set of partitions together with the two, partition shaped, pixmaps associated with the motion vectors. As defined above, "Partial Surface" pixels are computed as a combination, according to a given rule, of the pixmaps associated with the motion vectors.

Intra Prediction:

Intra prediction is upgraded in order to predict intra data according to the parametric model based partition of the block. Intra prediction with parametric model-based partition is defined in the same way as motion compensation and motion estimation with parametric model-based partitions, with the basic difference that intra prediction is used, instead, in order to fill each one of the generated partitions.

Figure 12:
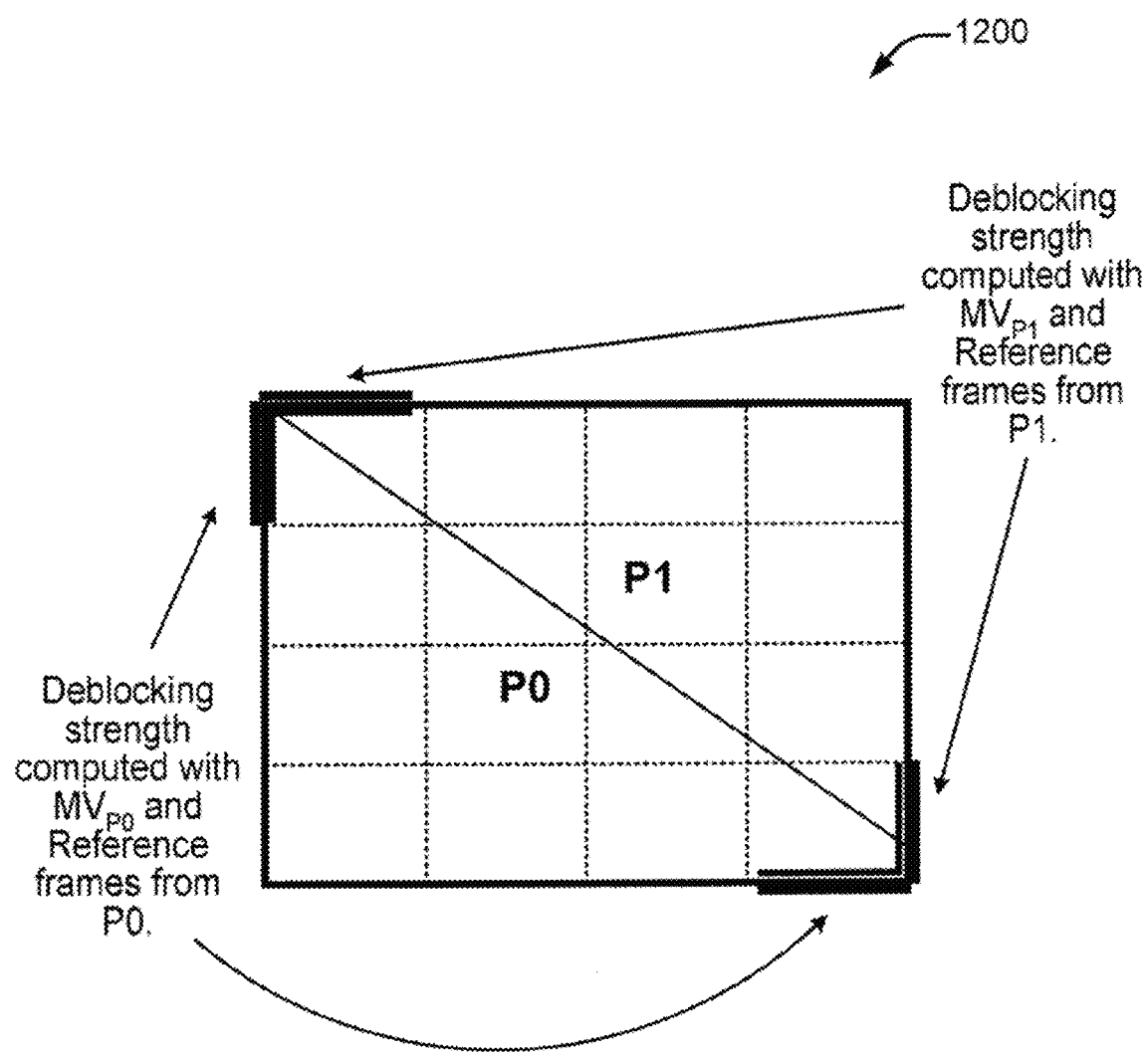
FIG. 12 shows a diagram for a parametric model based partitioned macroblock and its use together with a deblocking procedure, according to an embodiment of the present principles.

In-Loop De-Blocking Filter:

In-loop de-blocking filtering reduces blocking artifacts introduced by the block structure of the prediction, as well as, by the residual coding Discrete Cosine Transform (DCT). In-loop de-blocking filtering adapts filter strength depending on the encoded video data, as well as, depending on local intensity differences between pixels across block boundaries. An embodiment of the present principles introduces a new form of video data representation. Blocks including a parametric model-based partition do not necessarily have constant motion vector values, or constant reference frame values on every 4×4 block. Indeed, with the parametric model-based partition, in such arbitrary partitioned blocks, the area, and block boundaries affected by a given motion vector are defined by the shape enforced by the parametric model. Hence, a 4×4 block may appear to be half into one partition, and the other half into another partition, with all the implications this has, concerning the motion vector used and the reference frame used at a given location. The in-loop deblocking filter module is extended, thus, by adapting the process of the filter strength decision. This process should now be able to decide the filter strength taking into account the particular shape of internal block partitions. Depending on the part of the block boundary to filter, it needs to get the appropriate motion vector and reference frame according to the partition shape, and not according to the 4×4 block, as done by other MPEG-4 AVC modes. Turning to FIG. 12, a parametric model based partitioned macroblock is indicated generally by the reference numeral 1200. The parametric model based partitioned macroblock includes some examples of de-blocking areas with an indication of how information is selected for a deblocking filtering strength decision filtering strength is computed once per each 4×4 block side that is subject to de-blocking filtering.

The partition considered for filtering strength computation is selected by choosing the partition that overlaps the most with the block side to filter. However, a second alternative method, in order to simplify computation in corner blocks, is to consider the whole transform block to have the motion and reference frame information from the partition that includes the most part of both block edges subject to filtering.

A third alternative method for combining deblocking in-loop filtering with the use of parametric model-based blocks partitioning is to always allow some degree of filtering through block boundaries whenever and wherever the block boundary is affected by a model-based block partitioned mode (e.g., Geometric Mode). The Geometric Mode can be any of the blocks affecting/neighboring the boundary. At the same time, deblocking filtering may or may not be applied to those transform blocks, in a geometric mode, that are not located on the boundary of a macroblock.

A fourth alternative for combining deblocking in-loop filtering considers any of the two first methods but adds to the set of conditions that trigger the use of some degree of filtering in a transform block, the following: if the block boundary is affected by the transform block that includes the junction between the model-based partition curve and the macroblock boundary, then use some degree of deblocking.

Decoder Specific Blocks:
Decoder Control Module:

The decoder control module may be extended in order to take into account the new modes based on the parametric model-based block partition. These modes (Geometric Modes) are inserted within the existing ones in the MPEG-4 AVC Standard in the same way as performed at the encoder end. The decoder control module may be modified in order to perfectly match the structure and decoding procedures sequence of the encoder in order to recover exactly the information encoded at the encoder side.

Figure 20:
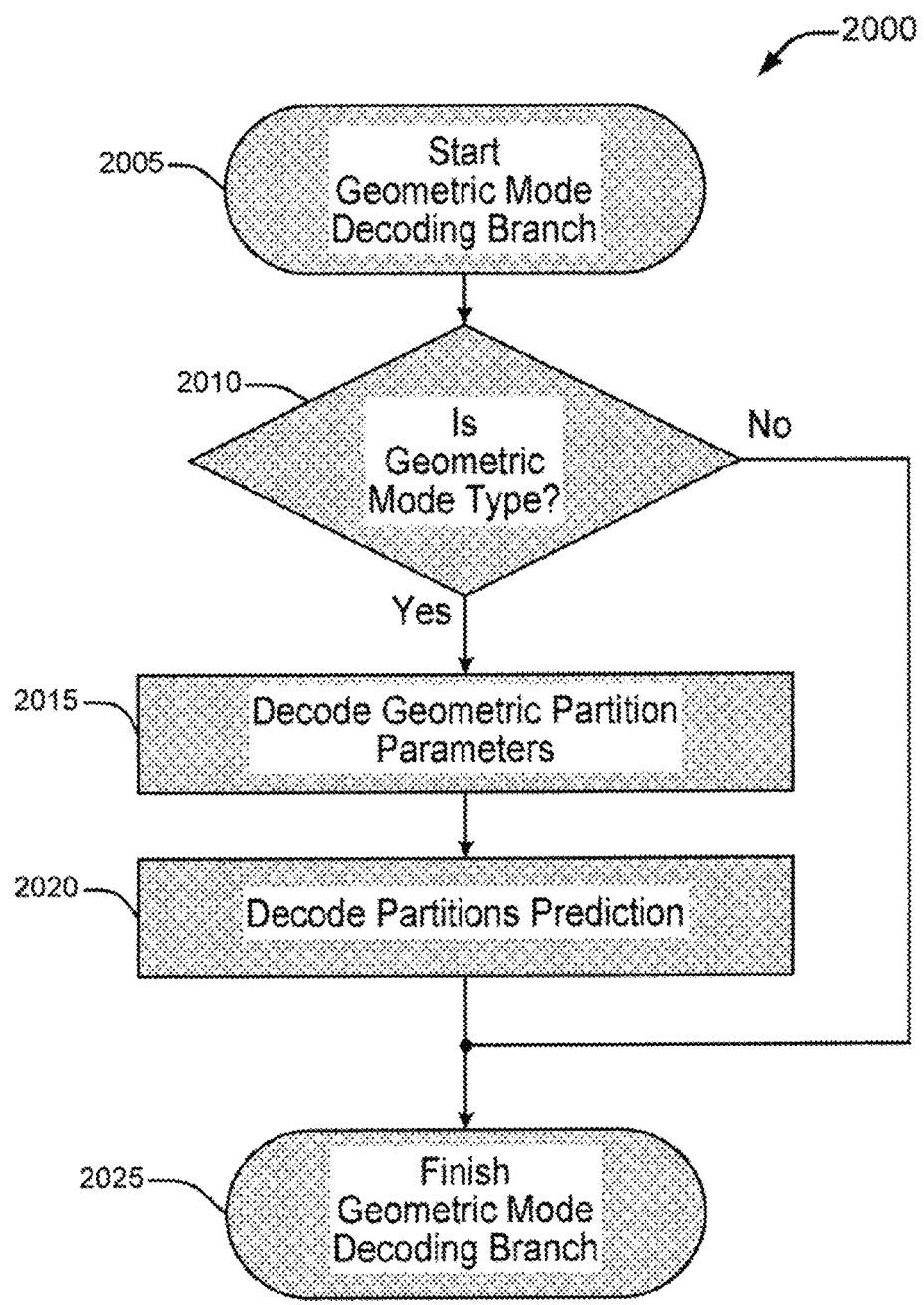
FIG. 20 shows a flow diagram for an exemplary method for decoding a geometrically partitioned prediction block, according to an embodiment of the present principles.

Entropy Decoding:

Entropy decoding may be extended for model-based block partitioning usage. According to the entropy coding procedure described above, entropy decoding needs to be extended such that it matches the encoding procedure described above. FIGS. 20, 21, and 22 describe possible particular embodiments of this for decoding the information related to parametric model-based coding modes, once the codeword, indicating which block mode is used, has been already decoded and is available for decoder control.

Turning to FIG. 20, an exemplary method for decoding a geometrically partitioned prediction block is indicated generally by the reference numeral 2000.

The method 2000 includes a start block 2005 that passes control to a function block 2010. The function block 2010 determines whether or not the current mode type is a geometric mode type. If so, then control is passed to a function block 2015. Otherwise, control is passed to an end block 2025.

The function block 2015 decodes the geometric partition parameters, and passes control to a function block 2020. The function block 2020 decodes the partitions prediction, and passes control to the end block 2025.

Figure 21A:
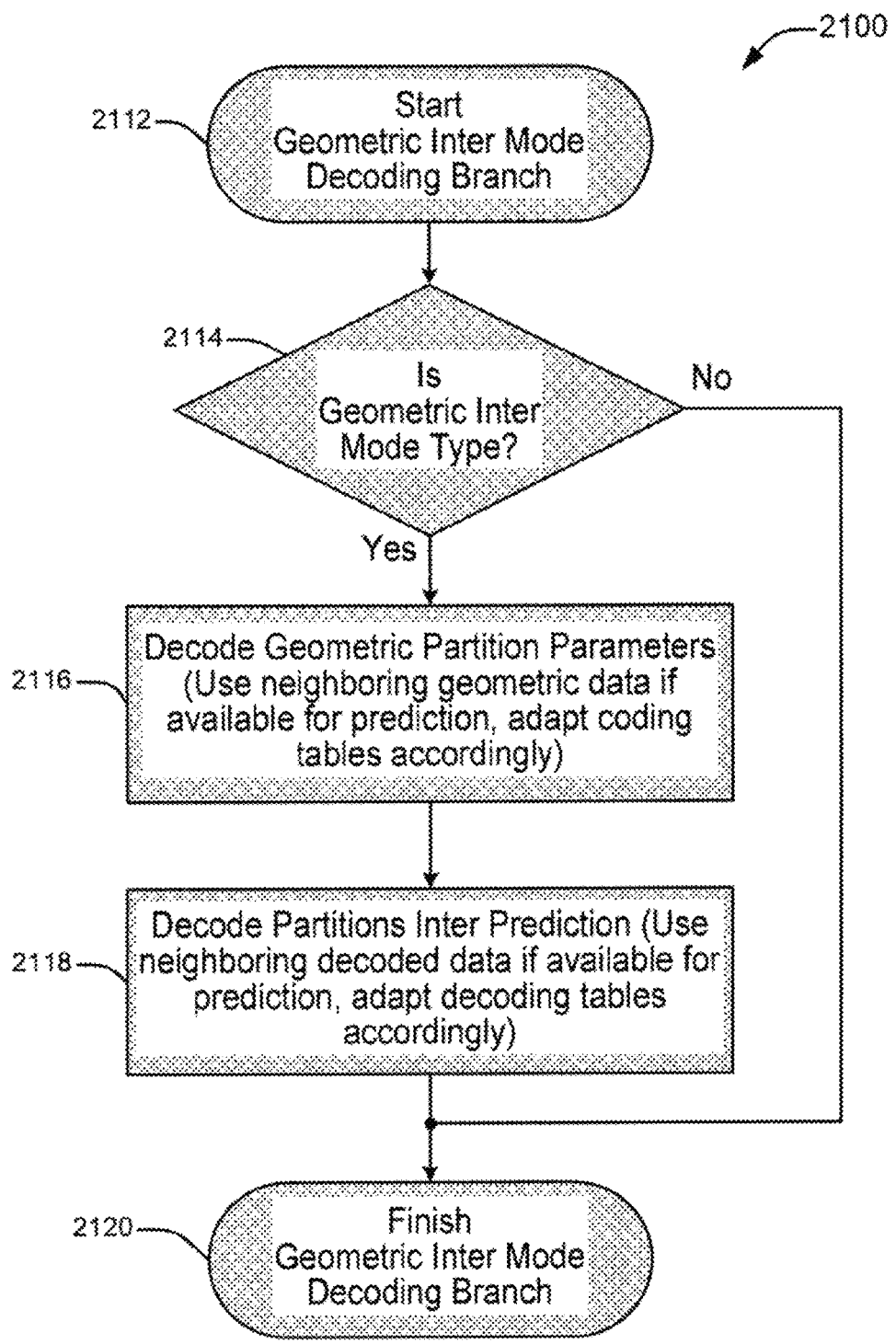
FIG. 21A shows a flow diagram for an exemplary method for decoding a geometrically partitioned inter prediction block, according to an embodiment of the present principles.
Figure 22:
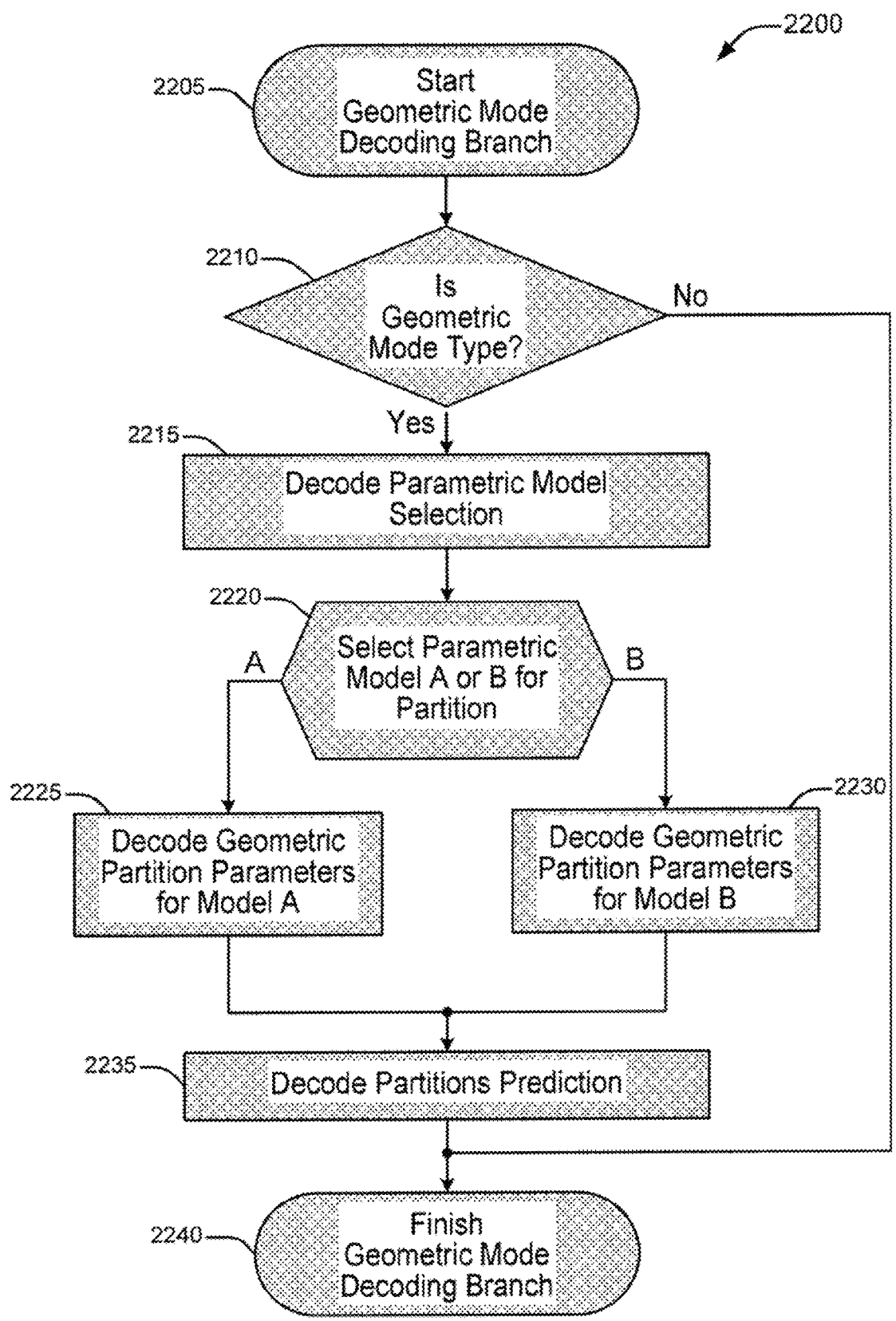
FIG. 22 shows a flow diagram for an exemplary method for decoding with multiple types of models, according to an embodiment of the present principles.

Turning to FIG. 21A, an exemplary method for decoding a geometrically partitioned inter prediction block is indicated generally by the reference numeral 2100.

The method 2100 includes a start block 2112 that passes control to a function block 2114. The function block 2114 determines whether or not the current mode type is a geometric mode type. If so, then control is passed to a function block 2116. Otherwise, control is passed to an end block 2120.

The function block 2116 decodes the geometric partition parameters (for example, using neighboring geometric data if available for prediction, and adapting coding tables accordingly), and passes control to a function block 2118. The function block 2118 decodes the partitions inter prediction (for example, using neighboring decoded data if available for prediction, and adapting coding tables accordingly), and passes control to the end block 2120.

Figure 21B:
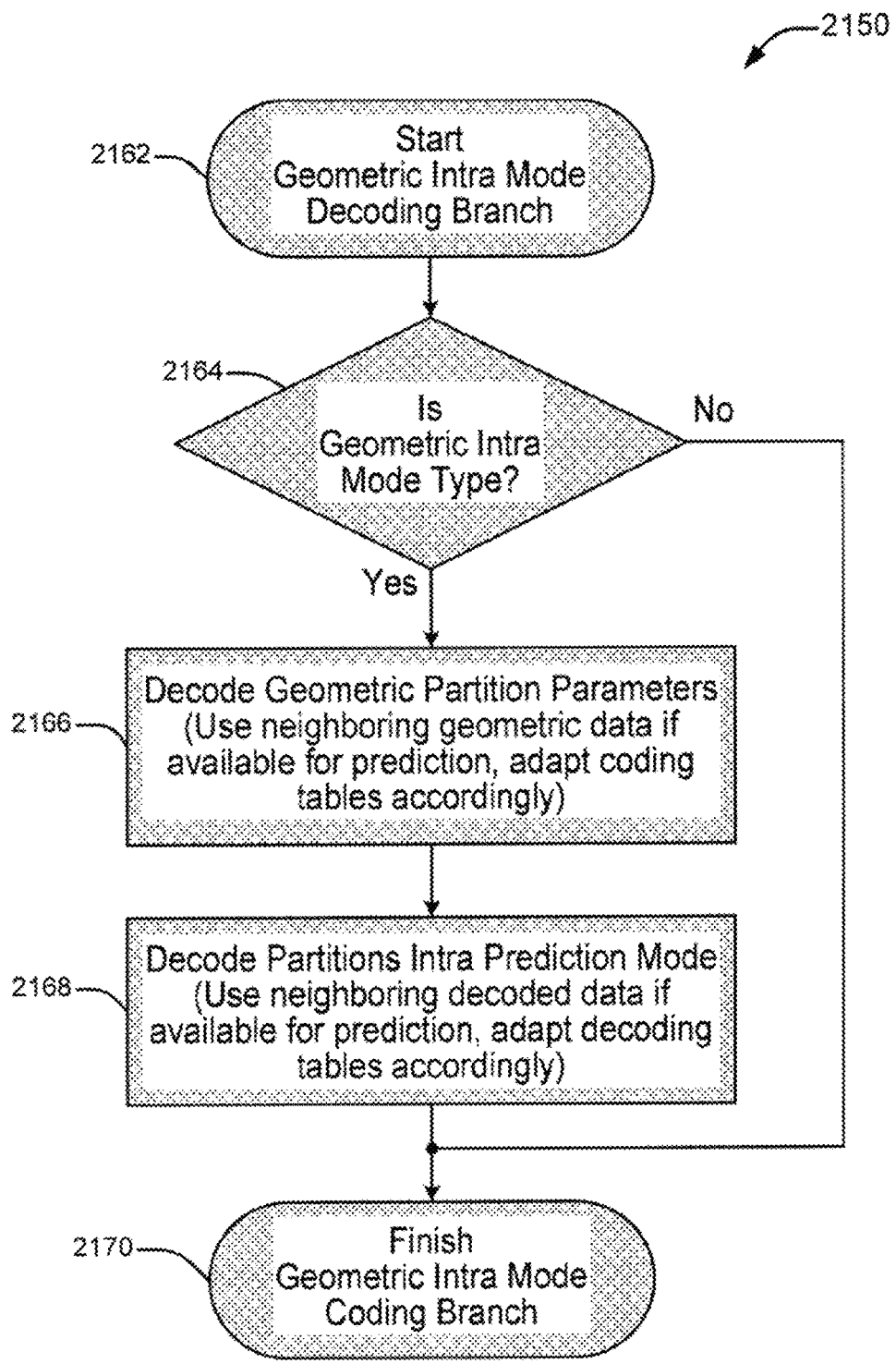
FIG. 21B shows a flow diagram for an exemplary method for decoding a geometrically partitioned intra prediction block, according to an embodiment of the present principles.

Turning to FIG. 21B, an exemplary method for decoding a geometrically partitioned intra prediction block is indicated generally by the reference numeral 2150.

The method 2150 includes a start block 2162 that passes control to a function block 2164. The function block 2164 determines whether or not the current mode type is a geometric mode type. If so, then control is passed to a function block 2166. Otherwise, control is passed to an end block 2170.

The function block 2166 decodes the geometric partition parameters (for example, using neighboring geometric data if available for prediction, and adapting coding tables accordingly), and passes control to a function block 2168. The function block 2168 decodes the partitions intra prediction (for example, using neighboring decoded data if available for prediction, and adapting coding tables accordingly), and passes control to the end block 2170.

Turning to FIG. 22, an exemplary method for decoding with multiple types of models is indicated generally by the reference numeral 2200.

The method 2200 includes a start block 2205 that passes control to a decision block 2210. The decision block 2210 determines whether or not the current mode type is a geometric mode type. If so, then control is passed to a function block 2215. Otherwise, control is passed to an end block 2240.

The function block 2215 decodes the parametric model selection, and passes control to a preparation block 2220. The preparation block 2220 selects parametric model A or B for the current partition. If parametric model A is selected, then control is passed to a function block 2225. Otherwise, if parametric model B is selected, then control is passed to a function block 2230.

The function block 225 decodes the geometric partition parameters for parametric model A, and passes control to a function block 2235.

The function block 2230 decodes the geometric partition parameters for parametric model B, and passes control to the function block 2235.

The function block 2235 decodes the partitions prediction, and passes control to an end block 2240.

Figure 23:
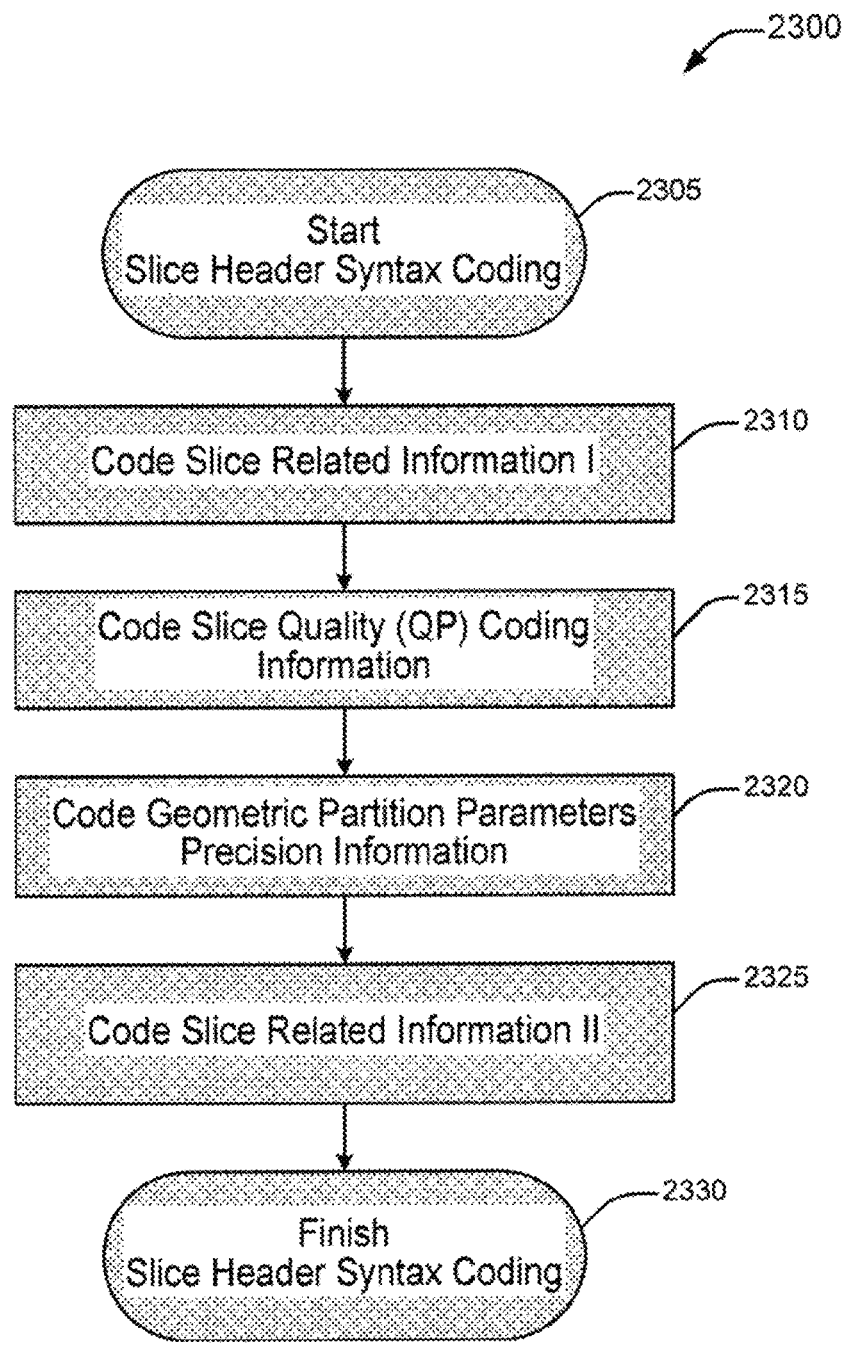
FIG. 23 shows a flow diagram for an exemplary method for slice header syntax coding, according to an embodiment of the present principles.

Turning to FIG. 23, an exemplary method for slice header syntax coding is indicated generally by the reference numeral 2300.

The method 2300 includes a start block that passes control to a function block 2310. The function block 2310 codes slice related information I, and passes control to a function block 2315. The function block 2315 codes the slice quality (QP) coding information, and passes control to a function block 2320. The function block 2320 codes the geometric parameters precision information, and passes control to a function block 2325. The function block 2325 codes the slice related information II, and passes control to an end block 230. The phrases "slice related information I" and "slice related information" denote slice header related information, such that the geometric precision parameters are inserted within the existing syntax of the slice header.

Figure 24:
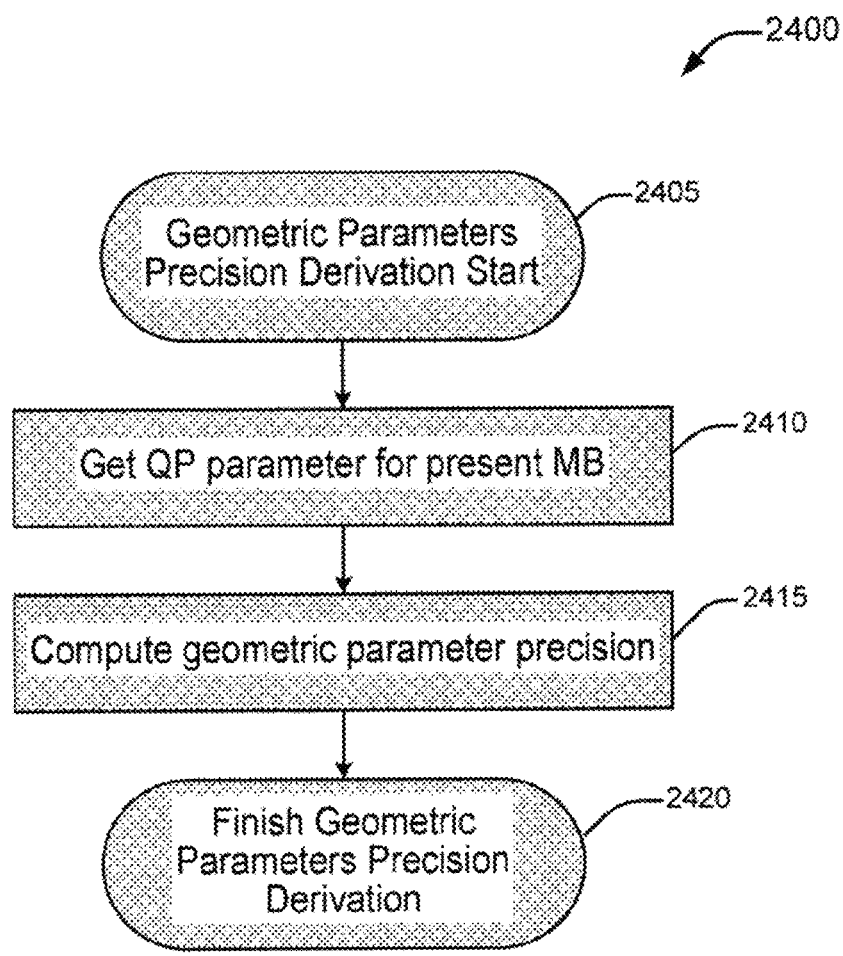
FIG. 24 shows a flow diagram for an exemplary method for deriving geometric parameters precision, according to an embodiment of the present principles.

Turning to FIG. 24, an exemplary method for deriving geometric parameters precision is indicated generally by the reference numeral 2400.

The method 2400 includes a start block 2405 that passes control to a function block 2410. The function block 2410 gets the QP parameter for the present (i.e., current) macroblock, and passes control to a function block 2415. The function block 2415 computes the geometric parameter precision, and passes control to an end block 2420.

Figure 25:
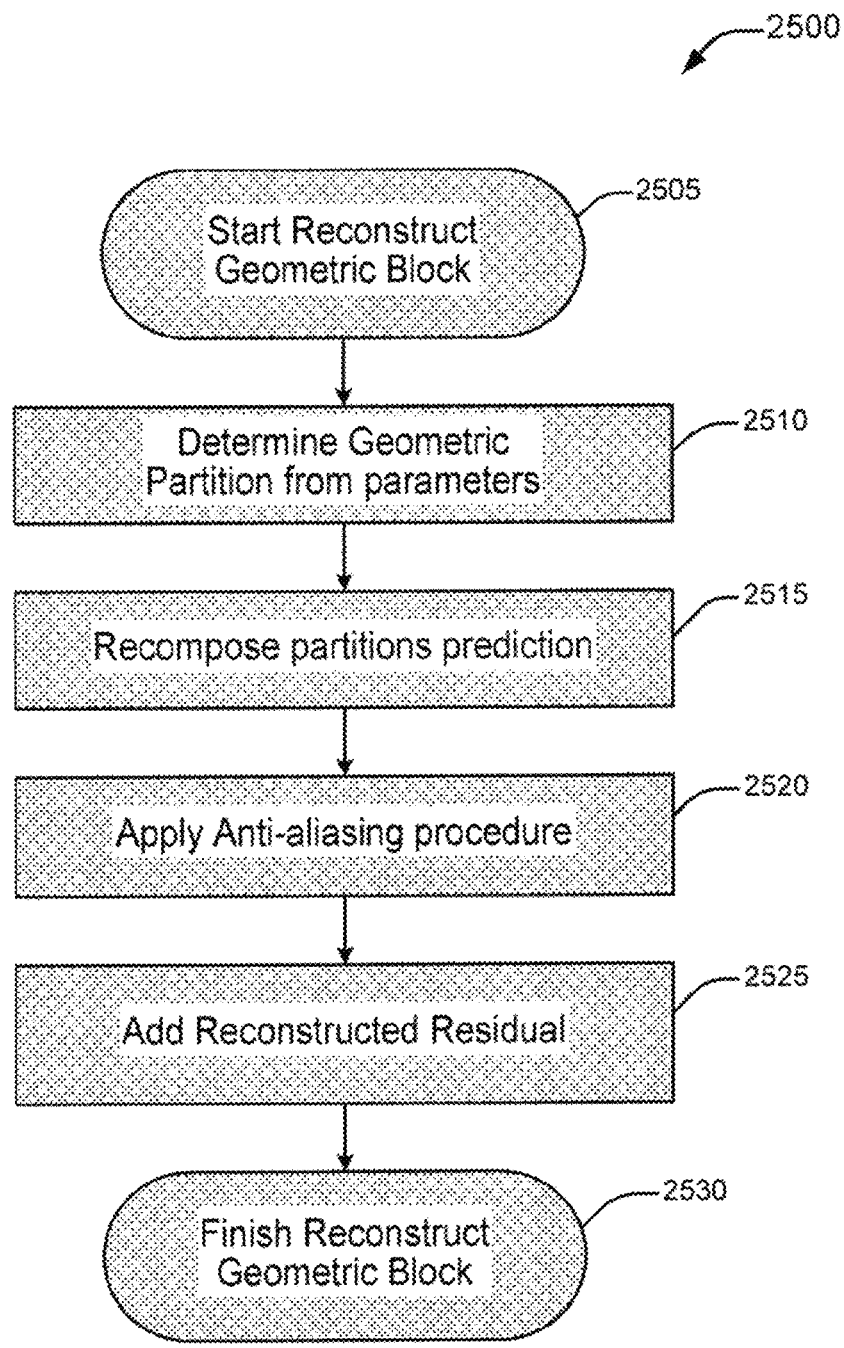
FIG. 25 shows a flow diagram for an exemplary method for reconstructing geometric blocks, according to an embodiment of the present principles.

Turning to FIG. 25, an exemplary method for reconstructing geometric blocks is indicated generally by the reference numeral 2500.

The method 2500 includes a start block 2505 that passes control to a function block 2510. The function block 2510 determines the geometric partition from the parameters, and passes control to a function block 2515. The function block 2515 recomposes the partitions prediction, and passes control to a function block 2520. The function block 2520 applies an anti-aliasing procedure, and passes control to a function block 2525. The function block 2525 adds the reconstructed residual, and passes control to an end block 2530.

Figure 26:
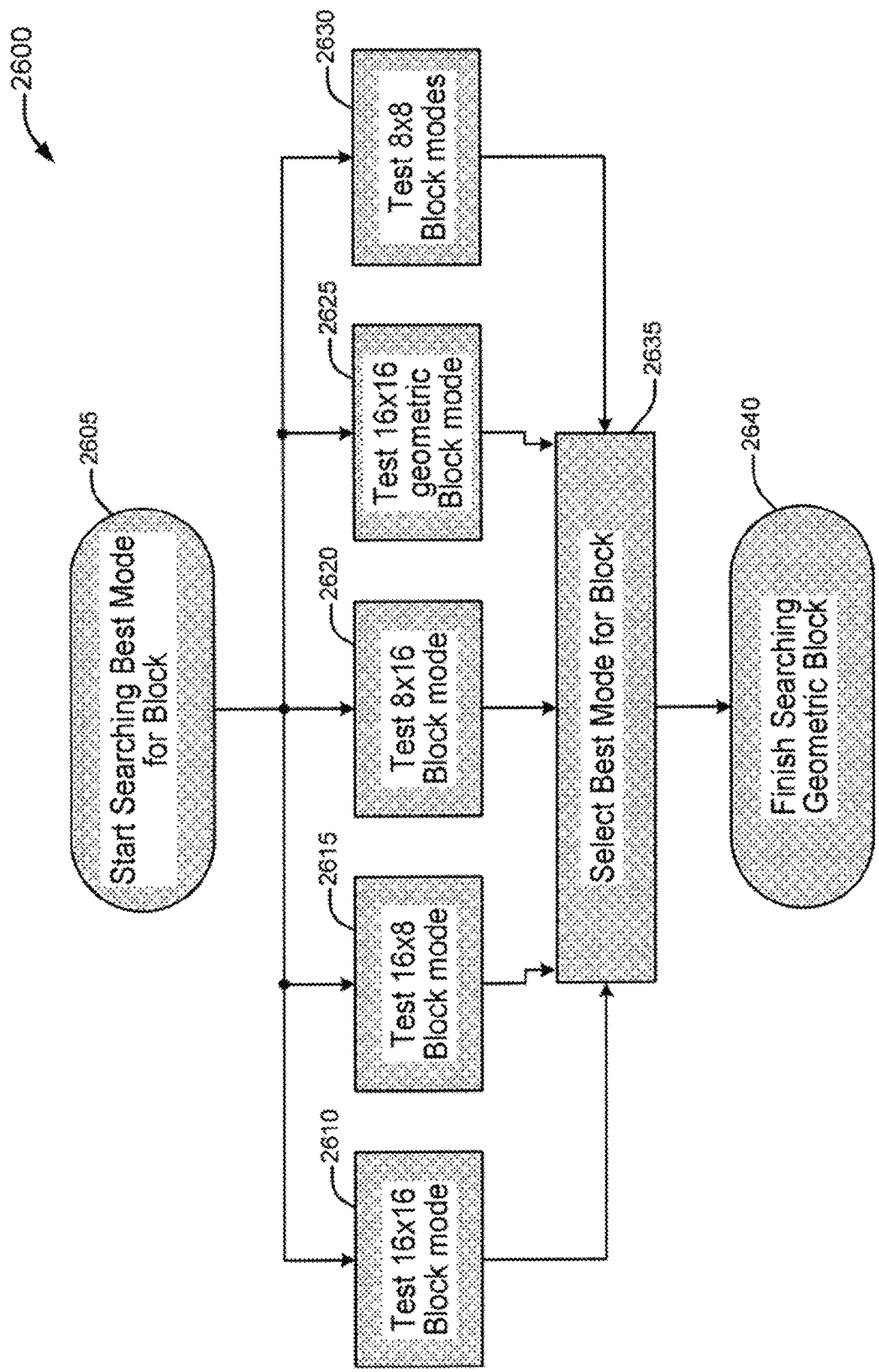
FIG. 26 shows a flow diagram for an exemplary method for searching for the best mode for a current block, according to an embodiment of the present principles.

Turning to FIG. 26, an exemplary method for searching for the best mode for a current block is indicated generally by the reference numeral 2600.

The method 2600 includes a start block 2605 that passes control to a function block 2610, a function block 2615, a function block 2620, a function block 2625, and a function block 2630. The function block 2610 tests the 16×16 block mode, and passes control to a function block 2635. The function block 2615 tests the 16×8 block mode, and passes control to a function block 2635. The function block 2620 tests the 8×16 block mode, and passes control to a function block 2635. The function block 2625 tests the 16×16 geometric block mode, and passes control to a function block 2635. The function block 2630 tests the 8×8 block modes, and passes control to a function block 2635.

The function block 2635 selects the best mode for the current block, and passes control to an end block 2640.

Figure 27:
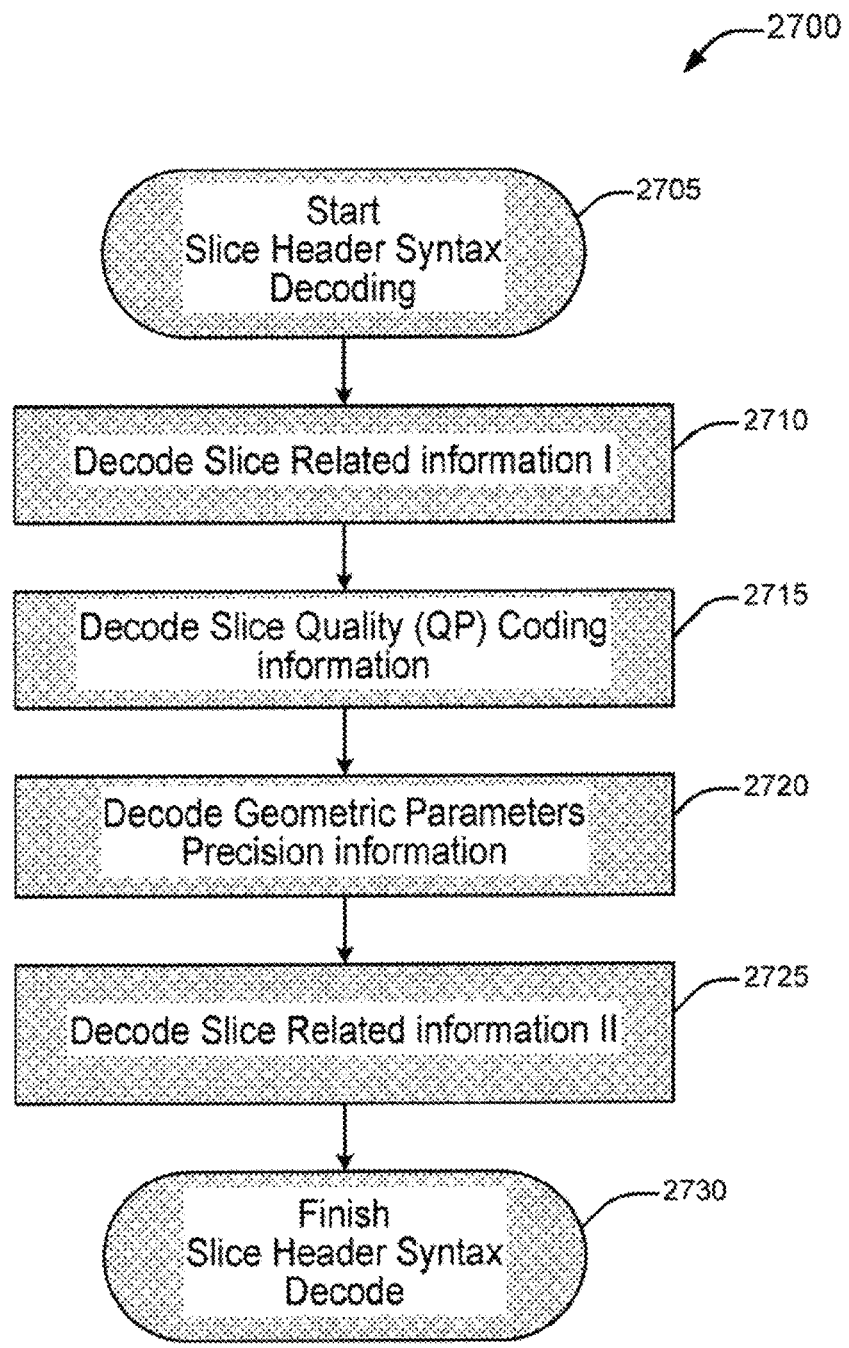
FIG. 27 shows a flow diagram for an exemplary method for slice header syntax decoding, according to an embodiment of the present principles.

Turning to FIG. 27, an exemplary method for slice header syntax decoding is indicated generally by the reference numeral 2700.

The method 2700 includes a start block 2705 that passes control to a function block 2710. The function block 2710 decodes the slice related information I, and passes control to a function block 2715. The function block 2715 decodes the slice quality (QP) coding information, and passes control to a function block 2720. The function block 2720 decodes the geometric parameters precision information, and passes control to a function block 2725. The function block 2725 decodes the slice related information II, and passes control to an end block 2730.

A description will now be given of some of the many attendant advantages/features of the present invention, some of which have been mentioned above. For example, one advantage/feature is an apparatus that includes an encoder for encoding image data corresponding to pictures by adaptively partitioning at least portions of the pictures responsive to at least one parametric model. The at least one parametric model involves at least one of implicit and explicit formulation of at least one curve.

Another advantage/feature is the apparatus having the encoder as described above, wherein at least one of the at least one parametric model and the at least one curve are derived from a geometric signal model.

Yet another advantage/feature is the apparatus having the encoder as described above, wherein at least one of the at least one parametric model and the at least one curve describe at least one of, one or more image contours, and, one or more motion boundaries.

Still another advantage/feature is the apparatus having the encoder as described above, wherein at least one polynomial is used as at least one of the at least one parametric model and the at least one curve.

Moreover, another advantage/feature is the apparatus having the encoder as described above, wherein a first order polynomial model is used as at least one of the at least one parametric model and the at least one curve.

Further, another advantage/feature is the apparatus having the encoder wherein a first order polynomial model is used as described above, wherein the first order polynomial model includes an angle parameter and a distance parameter.

Also, another advantage/feature is the apparatus having the encoder as described above, wherein the at least one parametric model for a given image portion is adaptively selected from a set of models when more than one parametric model is available, and the selection is explicitly or implicitly coded.

Additionally, another advantage/feature is the apparatus having the encoder as described above, wherein the encoder performs explicit or implicit coding of a precision of parameters of at least one of the at least one parametric model and the at least one curve using at least one high level syntax element.

Moreover, another advantage/feature is the apparatus having the encoder that uses the least one high level syntax element as described above, wherein the at least one high level syntax element is placed at at least one of a slice header level, a Supplemental Enhancement Information (SEI) level, a picture parameter set level, a sequence parameter set level and a network abstraction layer unit header level.

Further, another advantage/feature is the apparatus having the encoder as described above, wherein a precision of parameters of at least one of the at least one parametric model and the at least one curve is adapted in order to control at least one of compression efficiency and encoder complexity.

Also, another advantage/feature is the apparatus having the encoder as described above, wherein the precision of the parameters of at least one of the at least one parametric model and the at least one curve is adapted depending on a compression quality parameter.

Additionally, another advantage/feature is the apparatus having the encoder as described above, wherein predictor data, associated with at least one partition of at least one of the pictures, is predicted from at least one of spatial neighboring blocks and temporal neighboring blocks.

Moreover, another advantage/feature is the apparatus having the encoder as described above, wherein partition model parameters for at least one of the at least one parametric model and the at least one curve are predicted from at least one of spatial neighboring blocks and temporal neighboring blocks.

Further, another advantage/feature is the apparatus having the encoder as described above, wherein the encoder computes prediction values for pixels that, according to at least one of the at least one parametric model and the at least one curve, lay partly in more than one partition, using at least one of an anti-aliasing procedure, a combination of a part of prediction values for corresponding positions of the pixels, a totality of the prediction values for the corresponding positions of the pixels, a neighborhood, predictors of different partitions, from among the more than one partition, where the pixel is deemed to partly lay.

Also, another advantage/feature is the apparatus having the encoder as described above, wherein the encoder is an extended version of an existing hybrid predictive encoder of an existing video coding standard or video coding recommendation.

Additionally, another advantage/feature is the apparatus having the encoder that is the extended version of the existing hybrid predictive encoder of the existing video coding standard or video coding recommendation as described above, wherein the encoder applies parametric model based partitions to at least one of macroblocks and sub-macroblocks of the pictures as coding modes for at least one of the macroblocks and the sub-macroblocks, respectively.

Moreover, another advantage/feature is the apparatus having the encoder that applies the parametric model based partitions as described above, wherein parametric model-based coding modes are inserted within existing macroblock and sub-macroblock coding modes of an existing video coding standard or video coding recommendation.

Further, another advantage/feature is the apparatus having the encoder that applies the parametric model based partitions as described above, wherein the encoder encodes model parameters of at least one of the at least one parametric model and the at least one curve to generate the parametric model-based partitions along with partitions prediction data.

Also, another advantage/feature is the apparatus having the encoder that applies the parametric model based partitions as described above, wherein the encoder selects model parameters of at least one of the at least one parametric model, the at least one curve, and partition predictions in order to jointly minimize at least one of a distortion measure and a coding cost measure.

Additionally, another advantage/feature is the apparatus having the encoder that applies the parametric model based partitions as described above, wherein pixels of at least one of the pictures that overlap at least two parametric model-based partitions are a weighted linear average from predictions of the at least two parametric model-based partitions.

Moreover, another advantage/feature is the apparatus having the encoder that applies the parametric model based partitions as described above, wherein partition predictions are of at least one of the type inter and intra.

Further, another advantage/feature is the apparatus having the encoder that applies the parametric model based partitions as described above, wherein the encoder selectively uses parameter predictions for at least one of the at least one parametric model and the at least one curve for partition model parameters coding.

Also, another advantage/feature is the apparatus having the encoder that selectively uses the parameter predictions as described above, wherein a prediction for a current block of a particular one of the pictures is based on curve extrapolation from neighboring blocks into the current block.

Additionally, another advantage/feature is the apparatus having the encoder that selectively uses the parameter predictions as described above, wherein the encoder uses different contexts or coding tables to encode the image data depending on whether or not parameters of at least one of the at least one parametric model and the at least one curve are predicted.

Moreover, another advantage/feature is the apparatus having the encoder that applies the parametric model based partitions as described above, wherein the encoder is an extended version of an encoder for the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation.

Further, another advantage/feature is the apparatus having the encoder that applies the parametric model based partitions as described above, wherein the encoder applies at least one of deblocking filtering and reference frame filtering adapted to handle transform-size blocks affected by at least one parametric model-based partition due to non-tree-based partitioning of the at least one of the macroblocks and the sub-macroblocks when parametric model-based partition modes are used.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles are not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:
1. An apparatus for video decoding, comprising:
at least one processor being configured to:
decode a parametric model for a current block of a picture, wherein said block is partitioned to include a first partition and a second partition according to said parametric model, wherein said at least one processor is configured to partition by:
associating values with respective pixels of said current block according to said parametric model, and
classifying said pixels of said current block into partitions according to said associated values, wherein a first value according to said parametric model indicates that a pixel of said current block is in said first partition, a second value indicates that a pixel of said current block is in said second partition, and a value in between said first and second values indicates that a pixel of said current block is in a partial surface;

predict motion vectors for said first and second partitions based on at least one of spatial neighboring blocks and temporal neighboring blocks;
decode a first motion vector for said first partition and a second motion vector for said second partition based on said predicted motion vectors;
predict said current block to form a predicted block by:
predicting pixels in said first partition using a first predictor,
predicting pixels in said second partition using a second predictor, and
predicting pixels in said partial surface based on a weighted linear average of said first predictor and said second predictor, wherein said first predictor is weighted by w(x,y) and said second predictor is weighted by (1−w(x,y)) to form said weighted linear average, wherein w(x, y) is said value from said parametric model for pixel at location (x,y); and
decode said current block based on said predicted block.

2. The apparatus of claim 1, wherein each of said first and second motion vectors is predicted from an adaptively selected set of motion vectors from spatial and temporal neighboring blocks.

3. The apparatus of claim 1, wherein said parametric model corresponds to a first-degree polynomial function.

4. The apparatus of claim 1, wherein said at least one processor is further configured to:
predict said parametric model based on another parametric model of one or more spatial neighboring blocks, wherein said parametric model is decoded based on said predicted parametric model.

5. The apparatus of claim 4, wherein said another parametric model is projected from a spatial neighboring block into said current block to predict said parametric model.

6. The apparatus of claim 1, wherein said parametric model includes an angle parameter and a distance parameter.

7. The apparatus of claim 6, wherein a line associated with said another parametric model is continued from a spatial neighboring block into said current block for predict said parametric model.

8. An apparatus for video encoding, comprising:
at least one processor being configured to:
encode a parametric model for a current block of a picture, wherein said block is partitioned to include a first partition and a second partition according to said parametric model, wherein said at least one processor is configured to partition by:
associating values with respective pixels of said current block according to said parametric model, and
classifying said pixels of said current block into partitions according to said associated values, wherein a first value according to said parametric model indicates that a pixel of said current block is in said first partition, a second value indicates that a pixel of said current block is in said second partition, and a value in between said first and second values indicates that a pixel of said current block is in a partial surface;
predict motion vectors for said first and second partitions based on at least one of spatial neighboring blocks and temporal neighboring blocks;
encode a first motion vector for said first partition and a second motion vector for said second partition based on said predicted motion vectors;
predict said current block to form a predicted block by:
predicting pixels in said first partition using a first predictor,
predicting pixels in said second partition using a second predictor, and
predicting pixels in said partial surface based on a weighted linear average of said first predictor and said second predictor, wherein said first predictor is weighted by w(x,y) and said second predictor is weighted by (1−w(x,y)) to form said weighted linear average, wherein w(x, y) is said value from said parametric model for pixel at location (x,y); and
encode said current block based on said predicted block.

9. The apparatus of claim 8, wherein each of said first and second motion vectors is predicted from an adaptively selected set of motion vectors from spatial and temporal neighboring blocks.

10. The apparatus of claim 8, wherein said parametric model corresponds to a first-degree polynomial function.

11. The apparatus of claim 8, wherein said at least one processor is further configured to:
predict said parametric model based on another parametric model of one or more spatial neighboring blocks, wherein said parametric model is encoded based on said predicted parametric model.

12. The apparatus of claim 8, wherein said another parametric model is projected from a spatial neighboring block into said current block to predict said parametric model.

13. The apparatus of claim 8, wherein said parametric model includes an angle parameter and a distance parameter.

14. The apparatus of claim 13, wherein a line associated with said another parametric model is continued from a spatial neighboring block into said current block for predict said parametric model.

15. A method of video decoding, comprising:
decoding a parametric model for a current block of a picture, wherein said block is partitioned to include a first partition and a second partition according to said parametric model, wherein said partitioning includes:
associating values with respective pixels of said current block according to said parametric model, and
classifying said pixels of said current block into partitions according to said associated values, wherein a first value according to said parametric model indicates that a pixel of said current block is in said first partition, a second value indicates that a pixel of said current block is in said second partition, and a value in between said first and second values indicates that a pixel of said current block is in a partial surface;
predicting motion vectors for said first and second partitions based on at least one of spatial neighboring blocks and temporal neighboring blocks;
decoding a first motion vector for said first partition and a second motion vector for said second partition based on said predicted motion vectors;
predicting said current block to form a predicted block by:
predicting pixels in said first partition using a first predictor,
predicting pixels in said second partition using a second predictor, and
predicting pixels in said partial surface based on a weighted linear average of said first predictor and said second predictor, wherein said first predictor is weighted by w(x,y) and said second predictor is weighted by (1−w(x,y)) to form said weighted linear average, wherein w(x, y) is said value from said parametric model for pixel at location (x,y); and
decoding said current block based on said predicted block.

16. The method of claim 15, further comprising:
predicting said parametric model based on another parametric model of one or more spatial neighboring blocks, wherein said parametric model is decoded based on said predicted parametric model.

17. The method of claim 16, wherein said another parametric model is projected from a spatial neighboring block into said current block to predict said parametric model.

18. A method of video encoding, comprising:
encoding a parametric model for a current block of a picture, wherein said block is partitioned to include a first partition and a second partition according to said parametric model, wherein said partitioning includes:
associating values with respective pixels of said current block according to said parametric model, and
classifying said pixels of said current block into partitions according to said associated values, wherein a first value according to said parametric model indicates that a pixel of said current block is in said first partition, a second value indicates that a pixel of said current block is in said second partition, and a value in between said first and second values indicates that a pixel of said current block is in a partial surface;
predicting motion vectors for said first and second partitions based on at least one of spatial neighboring blocks and temporal neighboring blocks;
encoding a first motion vector for said first partition and a second motion vector for said second partition based on said predicted motion vectors;
predicting said current block to form a predicted block by:
predicting pixels in said first partition using a first predictor,
predicting pixels in said second partition using a second predictor, and
predicting pixels in said partial surface based on a weighted linear average of said first predictor and said second predictor, wherein said first predictor is weighted by w(x,y) and said second predictor is weighted by (1−w(x,y)) to form said weighted linear average, wherein w(x, y) is said value from said parametric model for pixel at location (x,y); and
encoding said current block based on said predicted block.

19. The method of claim 18, further comprising:
predicting said parametric model based on another parametric model of one or more spatial neighboring blocks, wherein said parametric model is encoded based on said predicted parametric model.

20. The method of claim 19, wherein said another parametric model is projected from a spatial neighboring block into said current block to predict said parametric model.

21. The method of claim 15, wherein each of said first and second motion vectors is predicted from an adaptively selected set of motion vectors from spatial and temporal neighboring blocks.

22. The method of claim 18, wherein each of said first and second motion vectors is predicted from an adaptively selected set of motion vectors from spatial and temporal neighboring blocks.

* * * * *